(12) United States Patent
Esswie

(10) Patent No.: US 12,696,121 B2
(45) Date of Patent: Jul. 28, 2026

(54) DISAGGREGATED TRAFFIC DELIVERY VIA A NON-TERRESTRIAL NETWORK

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 18/598,643

(22) Filed: Mar. 7, 2024

(65) Prior Publication Data

US 2025/0287241 A1 Sep. 11, 2025

(51) Int. Cl.
*H04W 24/10* (2009.01)
*H04W 84/06* (2009.01)
(52) U.S. Cl.
CPC ............ *H04W 24/10* (2013.01); *H04W 84/06* (2013.01)
(58) Field of Classification Search
CPC ... H04W 24/10; H04W 84/06; H04W 72/542; H04W 72/0453; H04B 7/18519; H04B 7/18523; H04B 7/155; H04B 7/1851; H04B 7/2615
See application file for complete search history.

(56) References Cited

U.S. PATENT DOCUMENTS 12,245,051 B2 3/2025 Kumar
2015/0189567 A1 7/2015 Srivastava 2015/0327018 A1* 11/2015 Rehnberg .............. G01S 5/0205
370/252
2021/0036769 A1* 2/2021 Sorond .............. H04B 7/18519
2023/0164580 A1 5/2023 Cui
2024/0040608 A1* 2/2024 Lee ........................ H04W 72/23
(Continued)

FOREIGN PATENT DOCUMENTS

EP 4598153 A1 8/2025

OTHER PUBLICATIONS

Esswie, Ali. "Non-Terrestrial Uplink Traffic Relaying" U.S. Appl. No. 18/598,633, filed Mar. 7, 2024, 64 pages.
(Continued)

*Primary Examiner* — Rushil P. Sampat
(74) *Attorney, Agent, or Firm* — Amin, Turocy & Watson, LLP

(57) ABSTRACT

A terrestrial radio access network node, conducting a communication session with a user equipment, may determine to offload, or disaggregate, downlink traffic, associated with the communication session, for delivery by a non-terrestrial network node based on an uplink signal strength, at the terrestrial node, corresponding to the user equipment and based on a downlink signal strength, at the user equipment, corresponding to the non-terrestrial network node. A determination to offload the downlink traffic flow for delivery via the non-terrestrial node may be based on analysis of the uplink signal strength or the downlink signal strength with respect to at least one criterion received from core network equipment. The user equipment may indicate to the terrestrial node downlink channel information corresponding to the non-terrestrial node and the terrestrial node may transmit to the non-terrestrial node transmission information usable by the non-terrestrial node to transmit the downlink traffic to the user equipment.

20 Claims, 12 Drawing Sheets

(56)         References Cited

U.S. PATENT DOCUMENTS

| | | |
|---|---|---|
| 2024/0340747 A1 | 10/2024 | Li |
| 2024/0349101 A1 | 10/2024 | Hwang |
| 2024/0405857 A1 | 12/2024 | Ji |
| 2025/0038832 A1 | 1/2025 | Shrestha |
| 2025/0056299 A1 | 2/2025 | Sayed |
| 2025/0056365 A1 | 2/2025 | Medeiros |
| 2025/0070951 A1 | 2/2025 | Zhou |
| 2025/0081066 A1 | 3/2025 | Khoshkholgh Dashtaki |
| 2025/0081160 A1 | 3/2025 | Saha |
| 2025/0088929 A1 | 3/2025 | Sayed Hassan |
| 2025/0088957 A1 | 3/2025 | Uchino |
| 2025/0106718 A1 | 3/2025 | Agarwal |
| 2025/0113203 A1 | 4/2025 | Zhou |
| 2025/0113305 A1 | 4/2025 | Ahmadian Tehrani |
| 2025/0142431 A1 | 5/2025 | Lee |
| 2025/0175920 A1 | 5/2025 | Lee |
| 2025/0175944 A1 | 5/2025 | Sheik |
| 2025/0184828 A1 | 6/2025 | Ou |
| 2025/0212081 A1 | 6/2025 | Luo |
| 2025/0267712 A1 | 8/2025 | Yin |
| 2025/0306841 A1 | 10/2025 | Yu |
| 2025/0350315 A1 | 11/2025 | Besquin |
| 2025/0358806 A1* | 11/2025 | Khamse-Ashari .... H04W 72/51 |
| 2026/0025775 A1* | 1/2026 | Sun ................... H04W 56/0045 |
| 2026/0040165 A1 | 2/2026 | Wang |

OTHER PUBLICATIONS

Office Action mailed Feb. 23, 2026 for U.S. Appl. No. 18/598,633, 36 pages.

* cited by examiner

300

Figure 5:
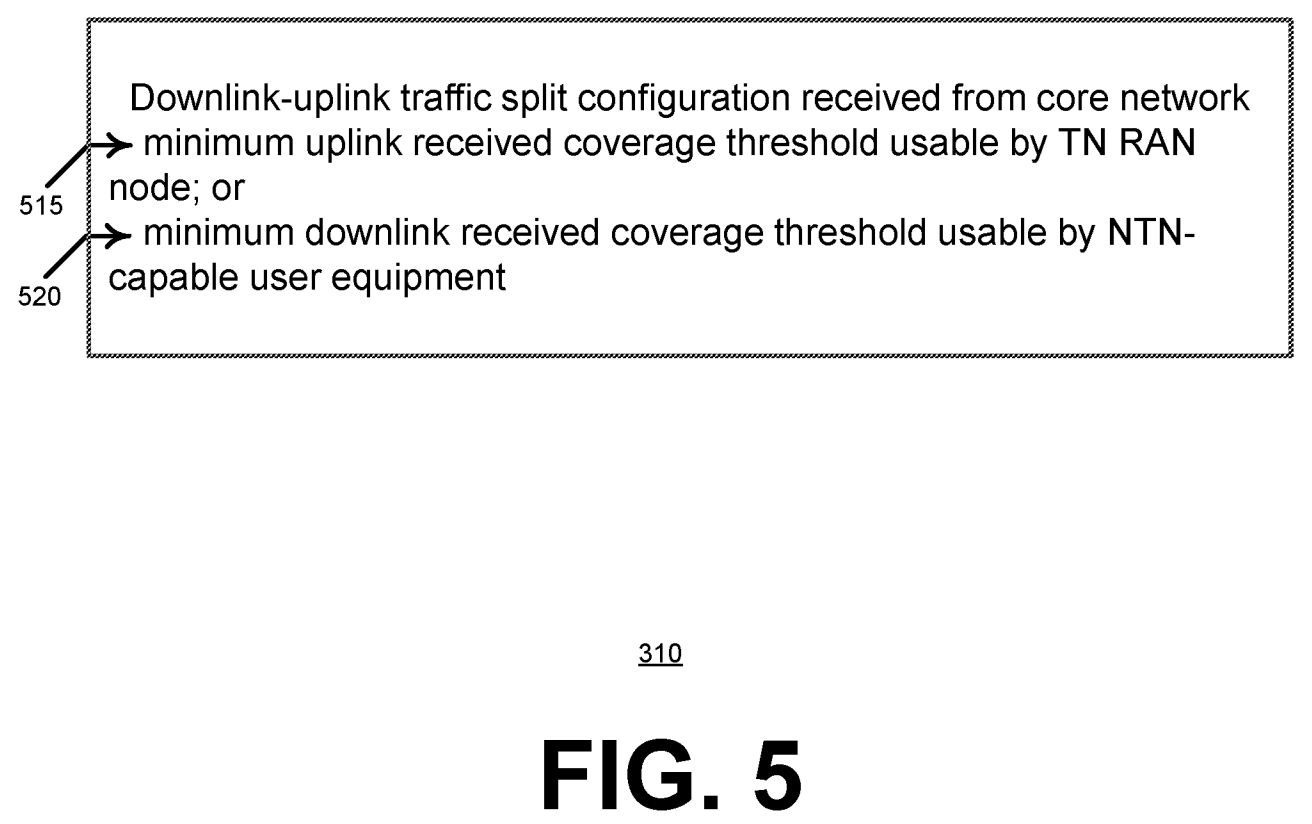

Downlink-uplink traffic split configuration received from core network

515 → minimum uplink received coverage threshold usable by TN RAN node; or

520 → minimum downlink received coverage threshold usable by NTN-capable user equipment

Figure 8:
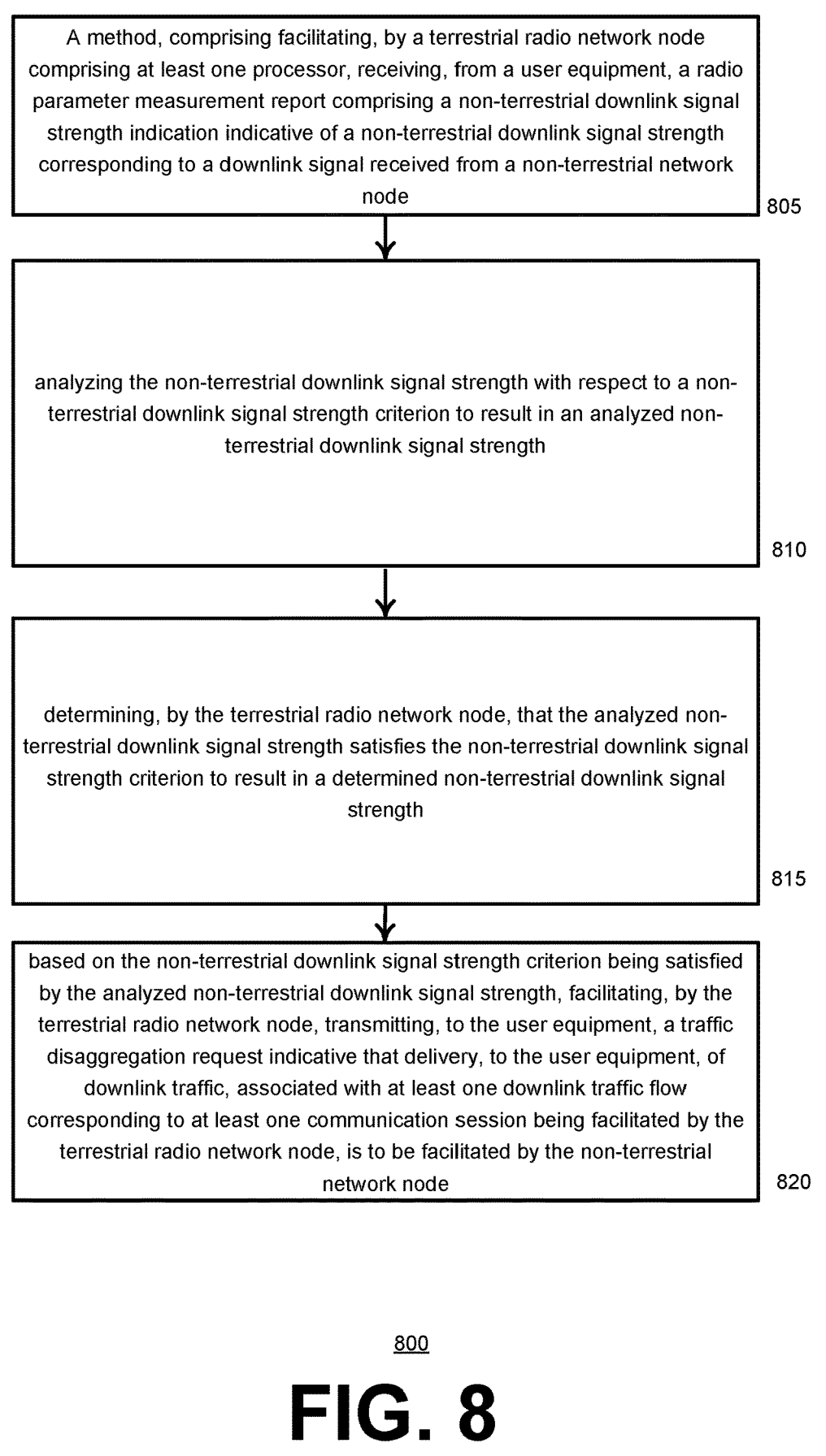

A method, comprising facilitating, by a terrestrial radio network node comprising at least one processor, receiving, from a user equipment, a radio parameter measurement report comprising a non-terrestrial downlink signal strength indication indicative of a non-terrestrial downlink signal strength corresponding to a downlink signal received from a non-terrestrial network node

805

↓ analyzing the non-terrestrial downlink signal strength with respect to a non-terrestrial downlink signal strength criterion to result in an analyzed non-terrestrial downlink signal strength

810

↓ determining, by the terrestrial radio network node, that the analyzed non-terrestrial downlink signal strength satisfies the non-terrestrial downlink signal strength criterion to result in a determined non-terrestrial downlink signal strength

815

↓ based on the non-terrestrial downlink signal strength criterion being satisfied by the analyzed non-terrestrial downlink signal strength, facilitating, by the terrestrial radio network node, transmitting, to the user equipment, a traffic disaggregation request indicative that delivery, to the user equipment, of downlink traffic, associated with at least one downlink traffic flow corresponding to at least one communication session being facilitated by the terrestrial radio network node, is to be facilitated by the non-terrestrial network node

Figure 9:
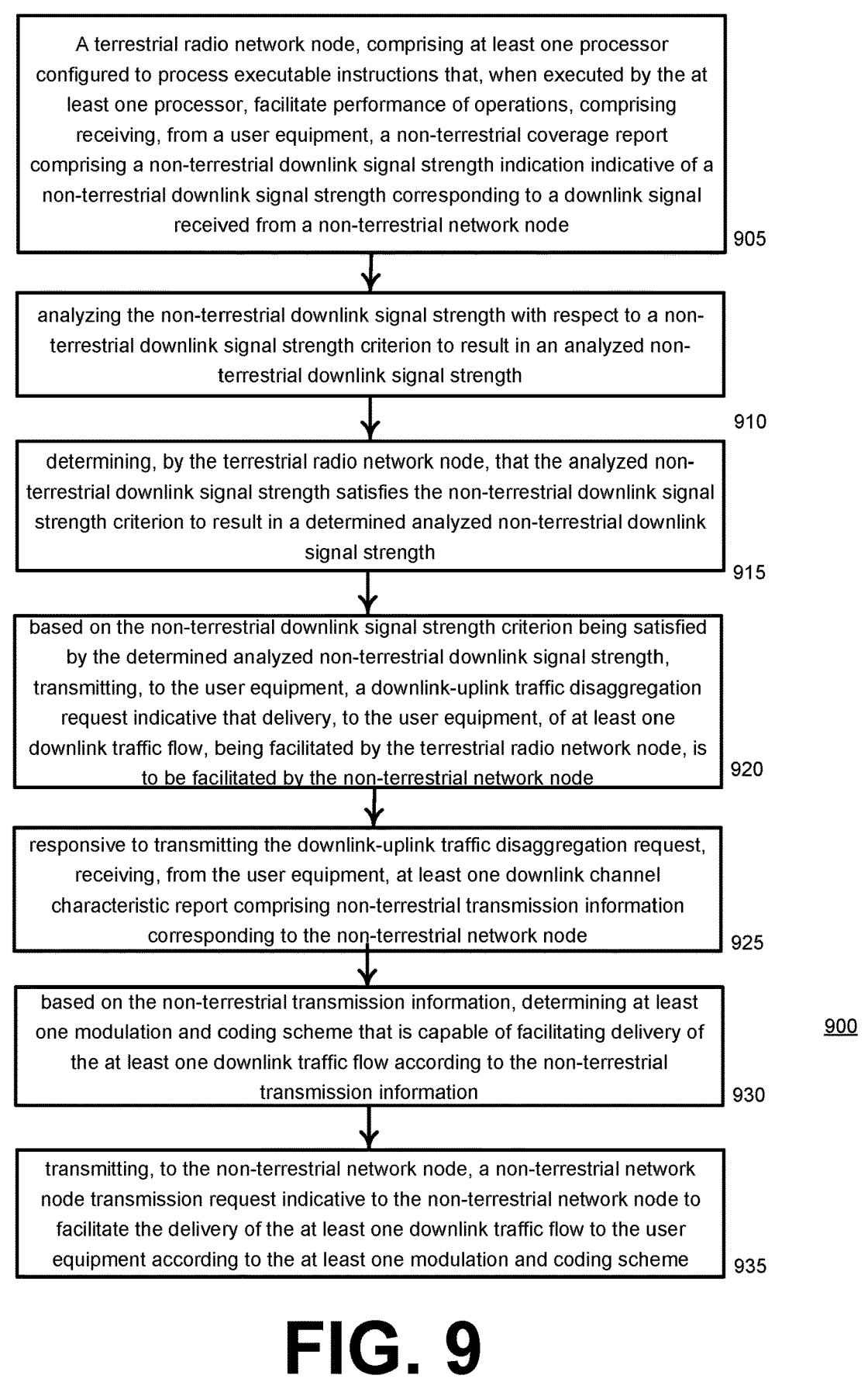

A terrestrial radio network node, comprising at least one processor configured to process executable instructions that, when executed by the at least one processor, facilitate performance of operations, comprising receiving, from a user equipment, a non-terrestrial coverage report comprising a non-terrestrial downlink signal strength indication indicative of a non-terrestrial downlink signal strength corresponding to a downlink signal received from a non-terrestrial network node

905 analyzing the non-terrestrial downlink signal strength with respect to a non-terrestrial downlink signal strength criterion to result in an analyzed non-terrestrial downlink signal strength

910 determining, by the terrestrial radio network node, that the analyzed non-terrestrial downlink signal strength satisfies the non-terrestrial downlink signal strength criterion to result in a determined analyzed non-terrestrial downlink signal strength

915 based on the non-terrestrial downlink signal strength criterion being satisfied by the determined analyzed non-terrestrial downlink signal strength, transmitting, to the user equipment, a downlink-uplink traffic disaggregation request indicative that delivery, to the user equipment, of at least one downlink traffic flow, being facilitated by the terrestrial radio network node, is to be facilitated by the non-terrestrial network node

920 responsive to transmitting the downlink-uplink traffic disaggregation request, receiving, from the user equipment, at least one downlink channel characteristic report comprising non-terrestrial transmission information corresponding to the non-terrestrial network node

925 based on the non-terrestrial transmission information, determining at least one modulation and coding scheme that is capable of facilitating delivery of the at least one downlink traffic flow according to the non-terrestrial transmission information

930

900 transmitting, to the non-terrestrial network node, a non-terrestrial network node transmission request indicative to the non-terrestrial network node to facilitate the delivery of the at least one downlink traffic flow to the user equipment according to the at least one modulation and coding scheme

Figure 10:
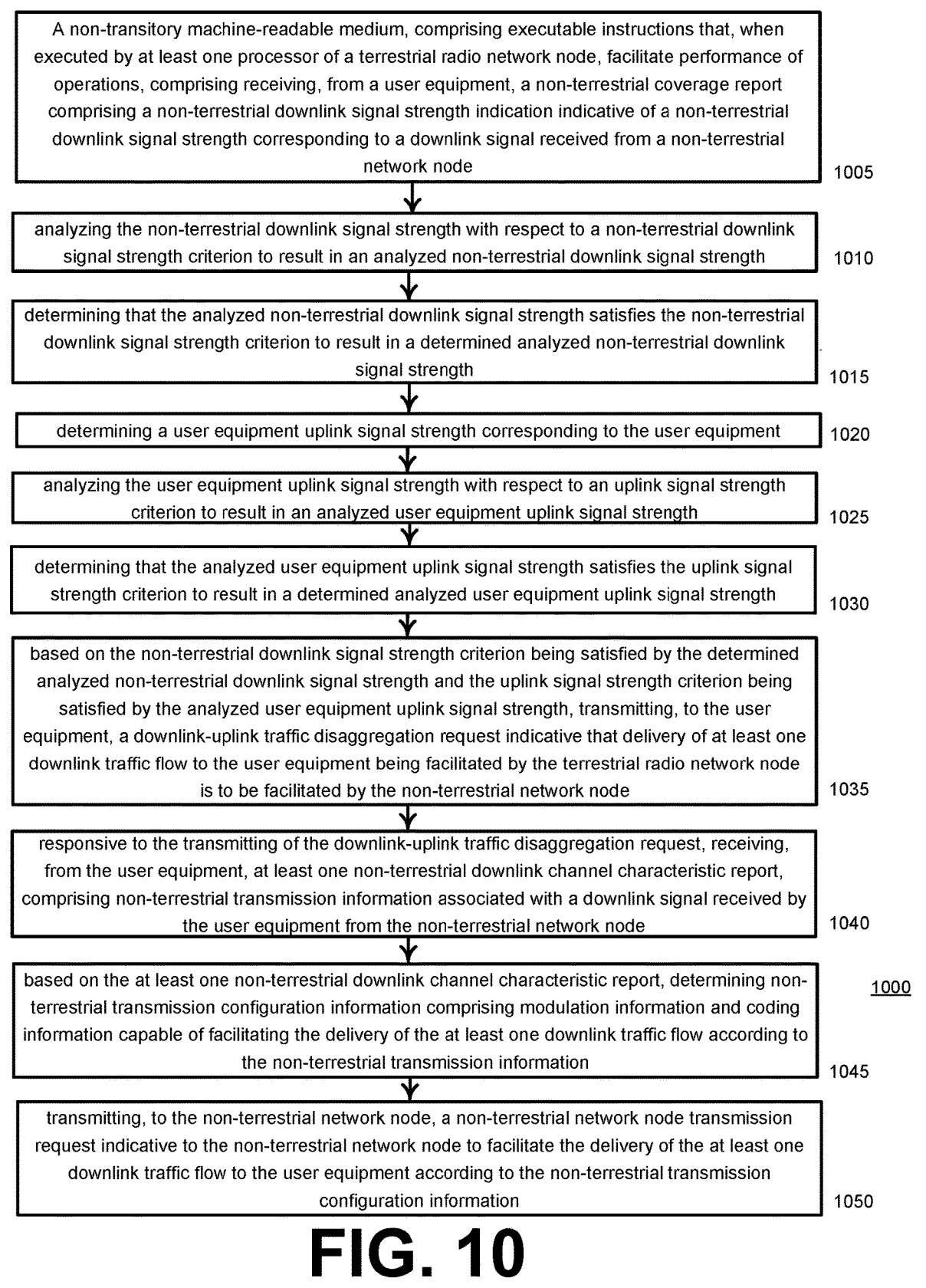

A non-transitory machine-readable medium, comprising executable instructions that, when executed by at least one processor of a terrestrial radio network node, facilitate performance of operations, comprising receiving, from a user equipment, a non-terrestrial coverage report comprising a non-terrestrial downlink signal strength indication indicative of a non-terrestrial downlink signal strength corresponding to a downlink signal received from a non-terrestrial network node

1005 analyzing the non-terrestrial downlink signal strength with respect to a non-terrestrial downlink signal strength criterion to result in an analyzed non-terrestrial downlink signal strength

1010 determining that the analyzed non-terrestrial downlink signal strength satisfies the non-terrestrial downlink signal strength criterion to result in a determined analyzed non-terrestrial downlink signal strength

1015 determining a user equipment uplink signal strength corresponding to the user equipment

1020 analyzing the user equipment uplink signal strength with respect to an uplink signal strength criterion to result in an analyzed user equipment uplink signal strength

1025 determining that the analyzed user equipment uplink signal strength satisfies the uplink signal strength criterion to result in a determined analyzed user equipment uplink signal strength

1030 based on the non-terrestrial downlink signal strength criterion being satisfied by the determined analyzed non-terrestrial downlink signal strength and the uplink signal strength criterion being satisfied by the analyzed user equipment uplink signal strength, transmitting, to the user equipment, a downlink-uplink traffic disaggregation request indicative that delivery of at least one downlink traffic flow to the user equipment being facilitated by the terrestrial radio network node is to be facilitated by the non-terrestrial network node

1035 responsive to the transmitting of the downlink-uplink traffic disaggregation request, receiving, from the user equipment, at least one non-terrestrial downlink channel characteristic report, comprising non-terrestrial transmission information associated with a downlink signal received by the user equipment from the non-terrestrial network node

1040 based on the at least one non-terrestrial downlink channel characteristic report, determining non-terrestrial transmission configuration information comprising modulation information and coding information capable of facilitating the delivery of the at least one downlink traffic flow according to the non-terrestrial transmission information

1000

1045 transmitting, to the non-terrestrial network node, a non-terrestrial network node transmission request indicative to the non-terrestrial network node to facilitate the delivery of the at least one downlink traffic flow to the user equipment according to the non-terrestrial transmission configuration information

DISAGGREGATED TRAFFIC DELIVERY VIA A NON-TERRESTRIAL NETWORK

BACKGROUND

The 'New Radio' (NR) terminology that is associated with fifth generation mobile wireless communication systems ("5G") refers to technical aspects used in wireless radio access networks ("RAN") that comprise several quality of service classes ("QoS"), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a terrestrial radio network node comprising at least one processor, receiving, from a user equipment, a radio parameter measurement report comprising a non-terrestrial downlink signal strength indication indicative of a non-terrestrial downlink signal strength corresponding to a downlink signal received from a non-terrestrial network node. The method may further comprise analyzing the non-terrestrial downlink signal strength with respect to a non-terrestrial downlink signal strength criterion to result in an analyzed non-terrestrial downlink signal strength and determining, by the terrestrial radio network node, that the analyzed non-terrestrial downlink signal strength satisfies the non-terrestrial downlink signal strength criterion to result in a determined non-terrestrial downlink signal strength. Based on the non-terrestrial downlink signal strength criterion being satisfied by the analyzed non-terrestrial downlink signal strength, the method may further comprise facilitating, by the terrestrial radio network node, transmitting, to the user equipment, a traffic disaggregation request indicative that delivery, to the user equipment, of downlink traffic, associated with at least one downlink traffic flow corresponding to at least one communication session being facilitated by the terrestrial radio network node, is to be facilitated by the non-terrestrial network node.

The traffic disaggregation request may comprise at least one of a non-terrestrial network node identifier corresponding to the non-terrestrial network node, at least one downlink traffic flow identifier associated with the at least one downlink traffic flow, or at least one downlink bearer identifier corresponding to at least one downlink bearer, according to which at least one downlink traffic flow from the terrestrial radio network node to the user equipment is being delivered.

In an embodiment, the method may further comprise determining, by the terrestrial radio network node, that at least one downlink traffic flow associated with at least one of the at least one downlink bearer identifier corresponds to a latency requirement that is more stringent than a non-terrestrial downlink latency corresponding to the non-terrestrial network node to result in a determined downlink bearer identifier and facilitating, by the terrestrial radio network node, delivery of at least one downlink traffic flow associated with the determined downlink bearer identifier.

The at least one downlink traffic flow corresponding to the at least one communication session being facilitated by the terrestrial radio network node that is to be facilitated by the non-terrestrial network node may comprise a first downlink traffic flow, wherein the at least one downlink traffic flow associated with the determined downlink bearer identifier is a second downlink traffic flow corresponding to the at least one communication session. The method may further comprise determining, by the terrestrial radio network node, that the first downlink traffic flow corresponds to a latency requirement that is less stringent than the non-terrestrial downlink latency.

In an embodiment, the method may further comprise facilitating, by the terrestrial radio network node, receiving, from the user equipment, at least one non-terrestrial downlink channel characteristic report comprising non-terrestrial transmission information corresponding to the non-terrestrial network node. Based on the non-terrestrial transmission information indicated in the at least one non-terrestrial downlink channel characteristic report, the method may further comprise determining, by the terrestrial radio network node, non-terrestrial modulation and coding capable of facilitating delivery, by the non-terrestrial network node, of the downlink traffic associated with at least one downlink traffic flow. The method may further comprise facilitating, by the terrestrial radio network node, transmitting, to the non-terrestrial network node, a non-terrestrial network node transmission request indicative to the non-terrestrial network node to facilitate the delivery of the downlink traffic associated with the at least one downlink traffic flow to the user equipment according to the non-terrestrial modulation and coding. The non-terrestrial transmission information indicated by the at least one non-terrestrial downlink channel characteristic report may comprise at least one of: a non-terrestrial channel quality indication, a precoding matrix indication, or a rank indication. The non-terrestrial network node transmission request comprises an identifier corresponding to the user equipment. The user equipment may be a first user equipment. The at least one downlink traffic flow may be a first downlink traffic flow. The at least one communication session may be a first communication session. The non-terrestrial modulation and coding scheme may be a first non-terrestrial modulation and coding scheme. Based on the non-terrestrial transmission information indicated in the at least one non-terrestrial downlink channel characteristic report, the method may further comprise determining, by the terrestrial radio network node, a second non-terrestrial modulation and coding scheme that is capable of facilitating delivery, by the non-terrestrial network node to a second user equipment, of downlink traffic associated with a second downlink traffic flow associated with a second communication session. The non-terrestrial network node transmission request may be further indicative to the non-terrestrial network node to facilitate delivery, to the second user equipment, of the downlink traffic associated with the second downlink traffic flow according to the second non-terrestrial modulation and coding scheme.

In an embodiment, the method may further comprise determining, by the terrestrial radio network node, a user equipment uplink signal strength corresponding to the user equipment, analyzing the user equipment uplink signal strength with respect to an uplink signal strength criterion to result in an analyzed user equipment uplink signal strength, and determining, by the terrestrial radio network node, that the analyzed user equipment uplink signal strength satisfies the uplink signal strength criterion to result in a determined user equipment uplink signal strength. The facilitating of the transmitting of the traffic disaggregation request may be further based on the uplink signal strength criterion being satisfied by the analyzed user equipment uplink signal strength. At least one of the non-terrestrial downlink signal strength criterion or the uplink signal strength criterion may be received by the terrestrial radio network node from core network computing equipment.

In another example embodiment, a terrestrial radio network node may comprising at least one processor configured to process executable instructions that, when executed by the at least one processor, facilitate performance of operations, the may comprise receiving, from a user equipment, a non-terrestrial coverage report comprising a non-terrestrial downlink signal strength indication indicative of a non-terrestrial downlink signal strength corresponding to a downlink signal received from a non-terrestrial network node, analyzing the non-terrestrial downlink signal strength with respect to a non-terrestrial downlink signal strength criterion to result in an analyzed non-terrestrial downlink signal strength, and determining, by the terrestrial radio network node, that the analyzed non-terrestrial downlink signal strength satisfies the non-terrestrial downlink signal strength criterion to result in a determined analyzed non-terrestrial downlink signal strength. Based on the non-terrestrial downlink signal strength criterion being satisfied by the determined analyzed non-terrestrial downlink signal strength, the operations may further comprise transmitting, to the user equipment, a downlink-uplink traffic disaggregation request indicative that delivery, to the user equipment, of at least one downlink traffic flow, being facilitated by the terrestrial radio network node, is to be facilitated by the non-terrestrial network node. Responsive to transmitting the downlink-uplink traffic disaggregation request, the operations may further comprise receiving, from the user equipment, at least one downlink channel characteristic report comprising non-terrestrial transmission information corresponding to the non-terrestrial network node. Based on the non-terrestrial transmission information, the operations may further comprise determining at least one modulation and coding scheme that is capable of facilitating delivery of the at least one downlink traffic flow according to the non-terrestrial transmission information. The method may further comprise transmitting, to the non-terrestrial network node, a non-terrestrial network node transmission request indicative to the non-terrestrial network node to facilitate the delivery of the at least one downlink traffic flow to the user equipment according to the at least one modulation and coding scheme.

In an embodiment, the operations may further comprise determining a user equipment uplink signal strength corresponding to the user equipment, analyzing the user equipment uplink signal strength with respect to an uplink signal strength criterion to result in an analyzed user equipment uplink signal strength, and determining, by the terrestrial radio network node, that the analyzed user equipment uplink signal strength satisfies the uplink signal strength criterion to result in a determined user equipment uplink signal strength. The facilitating of the transmitting of the downlink-uplink traffic disaggregation request may be further based on the uplink signal strength criterion being satisfied by the analyzed user equipment uplink signal strength.

In an embodiment, the at least one downlink traffic flow may comprise a first downlink traffic flow and a second downlink traffic flow. The non-terrestrial network node transmission request may be indicative to the non-terrestrial network node to facilitate delivery of the first downlink traffic flow and the second downlink traffic flow according to the at least one modulation and coding scheme.

In an embodiment, the at least one downlink traffic flow may comprise a first downlink traffic flow associated with a first latency requirement and a second downlink traffic flow associated with a second latency requirement. The at least one modulation and coding scheme may comprise a first modulation and coding scheme and a second modulation and coding scheme. The non-terrestrial network node transmission request may be indicative to the non-terrestrial network node to facilitate delivery of the first downlink traffic flow according to the first modulation and coding scheme and to facilitate delivery of the second downlink traffic flow according to the second modulation and coding scheme.

In an embodiment, the at least one downlink traffic flow being facilitated by the terrestrial radio network node may comprise a first downlink traffic flow associated with a first latency requirement and a second downlink traffic flow associated with a second latency requirement. The operations may further comprise determining that the first latency requirement is capable of being satisfied by transmission of the first downlink traffic flow by the non-terrestrial network node, wherein the non-terrestrial network node transmission request is indicative to the non-terrestrial network node to facilitate delivery of the first downlink traffic flow to the user equipment according to the at least one modulation and coding scheme, determining that transmission of the second downlink traffic flow by the non-terrestrial network node corresponds to nonsatisfaction of the second latency requirement, and avoiding indicating in the non-terrestrial network node transmission request that the non-terrestrial network node is to facilitate delivery of the second downlink traffic flow to the user equipment.

In yet another example embodiment, a non-transitory machine-readable medium may comprising executable instructions that, when executed by at least one processor of a terrestrial radio network node, may facilitate performance of operations that may comprise receiving, from a user equipment, a non-terrestrial coverage report comprising a non-terrestrial downlink signal strength indication indicative of a non-terrestrial downlink signal strength corresponding to a downlink signal received from a non-terrestrial network node. The operations may further comprise analyzing the non-terrestrial downlink signal strength with respect to a non-terrestrial downlink signal strength criterion to result in an analyzed non-terrestrial downlink signal strength and determining that the analyzed non-terrestrial downlink signal strength satisfies the non-terrestrial downlink signal strength criterion to result in a determined analyzed non-terrestrial downlink signal strength. The operations may further comprise determining a user equipment uplink signal strength corresponding to the user equipment, analyzing the user equipment uplink signal strength with respect to an uplink signal strength criterion to result in an analyzed user equipment uplink signal strength, and determining that the analyzed user equipment uplink signal strength satisfies the uplink signal strength criterion to result in a determined analyzed user equipment uplink signal strength. Based on the non-terrestrial downlink signal strength criterion being satisfied by the determined analyzed non-terrestrial downlink signal strength and the uplink signal strength criterion being satisfied by the analyzed user equipment uplink signal strength, the operations may further comprise transmitting, to the user equipment, a downlink-uplink traffic disaggregation request indicative that delivery of at least one downlink traffic flow to the user equipment being facilitated by the terrestrial radio network node is to be facilitated by the non-terrestrial network node. Responsive to the transmitting of the downlink-uplink traffic disaggregation request, receiving, from the user equipment, at least one non-terrestrial downlink channel characteristic report, comprising non-terrestrial transmission information associated with a downlink signal received by the user equipment from the non-terrestrial network node. Based on the at least one non-terrestrial downlink channel characteristic report, the operations may further comprise determining non-terrestrial transmission configuration information comprising modulation information and coding information capable of facilitating the delivery of the at least one downlink traffic flow according to the non-terrestrial transmission information and transmitting, to the non-terrestrial network node, a non-terrestrial network node transmission request indicative to the non-terrestrial network node to facilitate the delivery of the at least one downlink traffic flow to the user equipment according to the non-terrestrial transmission configuration information.

The non-terrestrial network node transmission request may comprise at least one of: a non-terrestrial network node identifier corresponding to the non-terrestrial network node; at least one downlink traffic flow identifier associated with the at least one downlink traffic flow; or at least one downlink bearer identifier corresponding to at least one downlink bearer, according to which at least one downlink traffic flow from the terrestrial radio network node to the user equipment is being delivered.

The non-terrestrial transmission information indicated by the at least one non-terrestrial downlink channel characteristic report may comprise at least one of: a non-terrestrial channel quality indication, a precoding matrix indication, or a rank indication.

In an embodiment, the operations the operations may further comprise during facilitation, by the non-terrestrial network node, of the delivery of the at least one downlink traffic flow to the user equipment, receiving, from the user equipment, downlink control information corresponding to the at least one downlink traffic flow, and directing the downlink control information to the non-terrestrial network node.

In an embodiment, the directing of the downlink control information to the non-terrestrial network node may comprise transmitting the downlink control information to a non-terrestrial gateway via a backhaul communication link.

6

Figure 3:
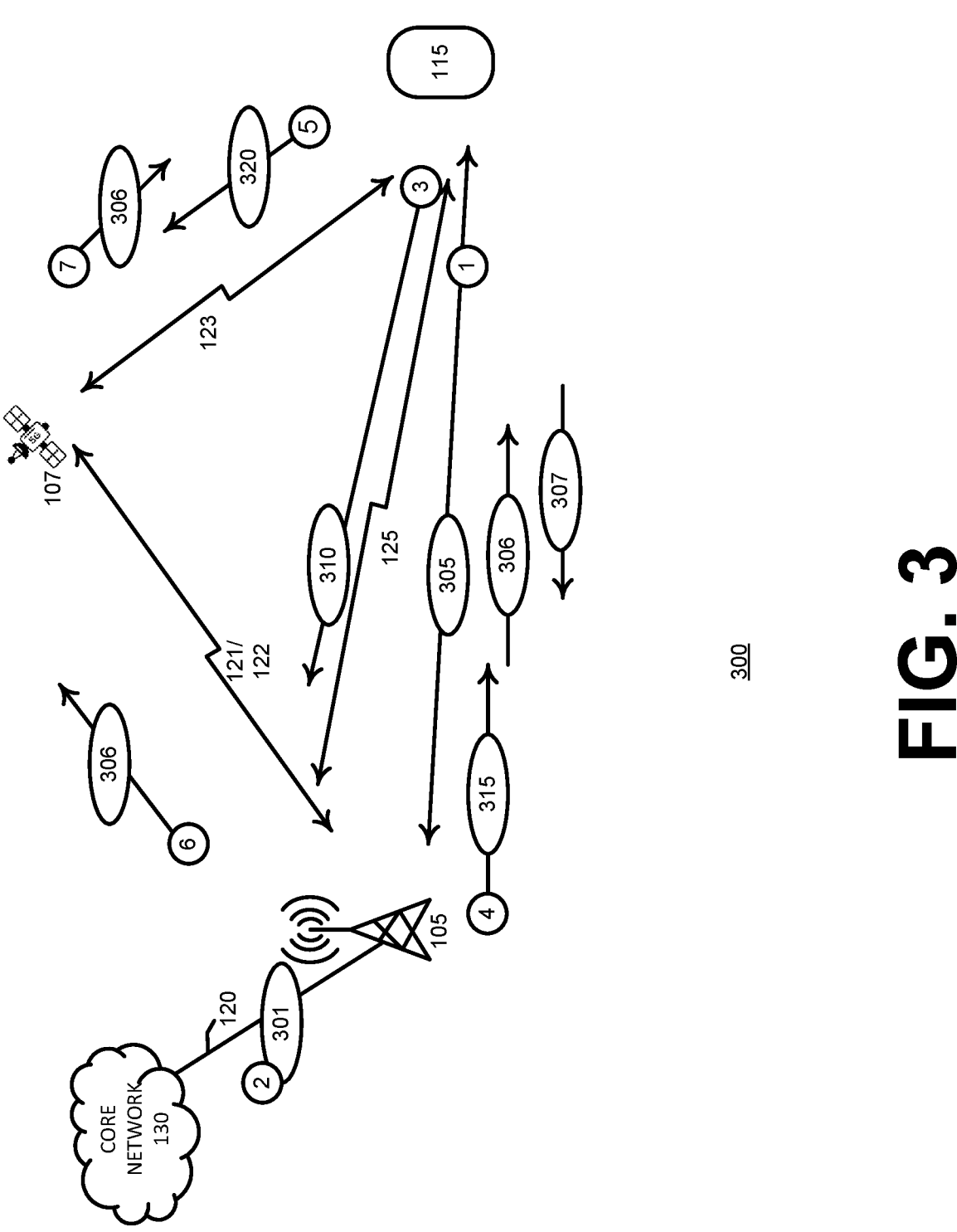

FIG. 3 illustrates an example environment with a non-terrestrial radio network node facilitating traffic delivery with a user equipment.

Figure 4:
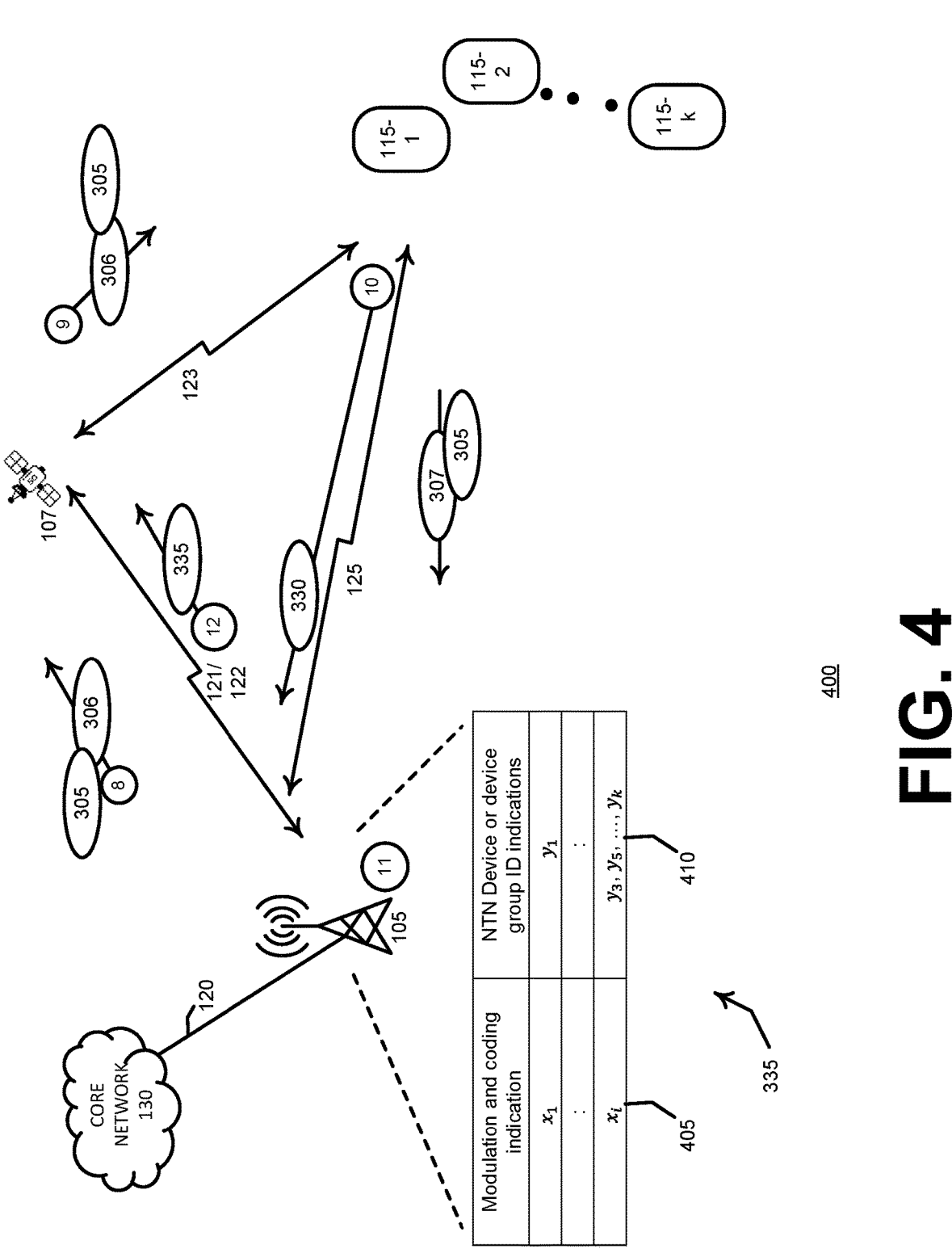

FIG. 4 illustrates an example environment with a non-terrestrial radio network node facilitating traffic delivery with a user equipment and an example disaggregated traffic NTN channel quality adaptation configuration.

FIG. 5 illustrates an example traffic split configuration.

Figure 6:
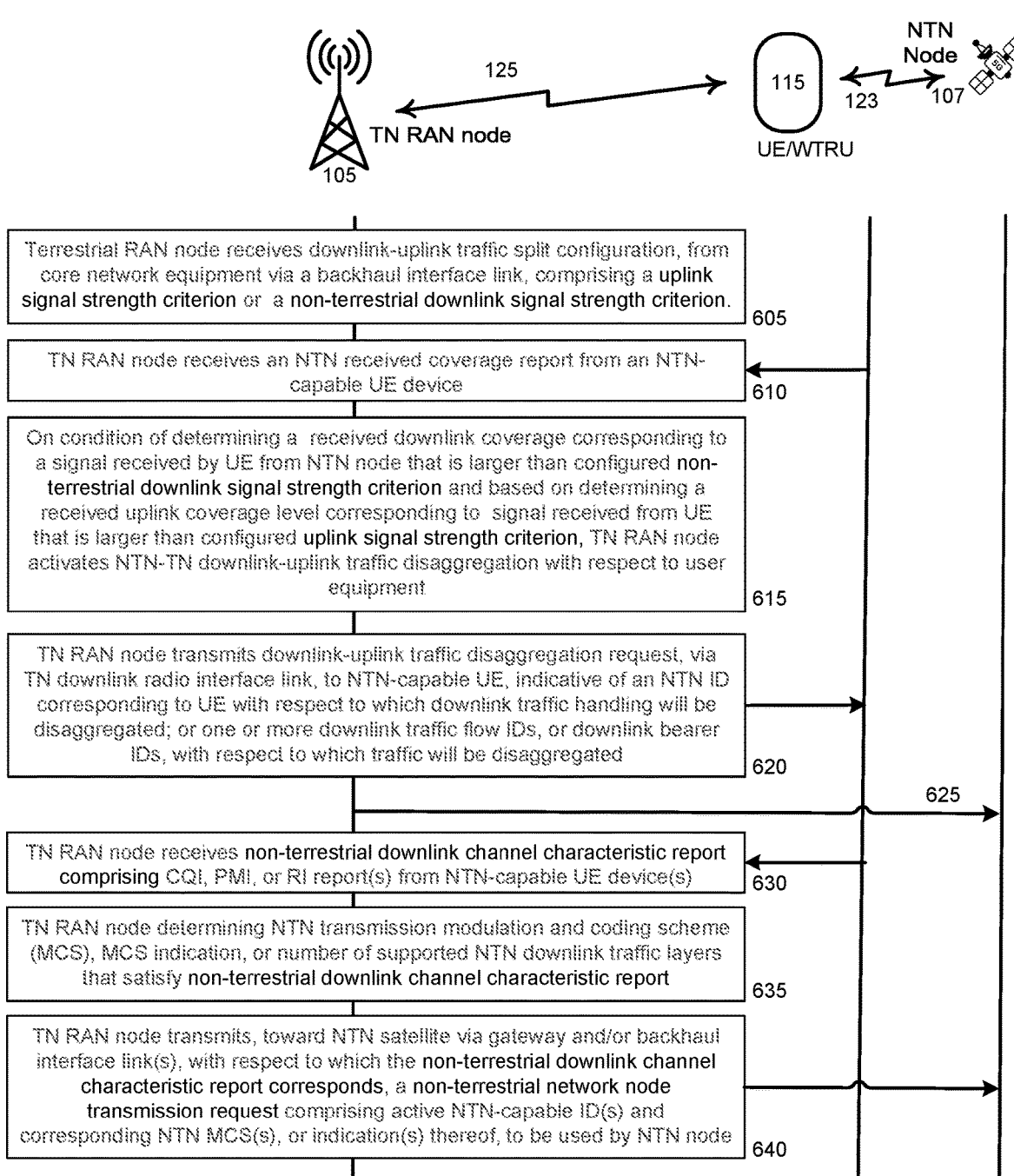

FIG. 6 illustrates a timing diagram of an example embodiment of a non-terrestrial network node facilitating delivery of traffic with a user equipment.

Figure 7:
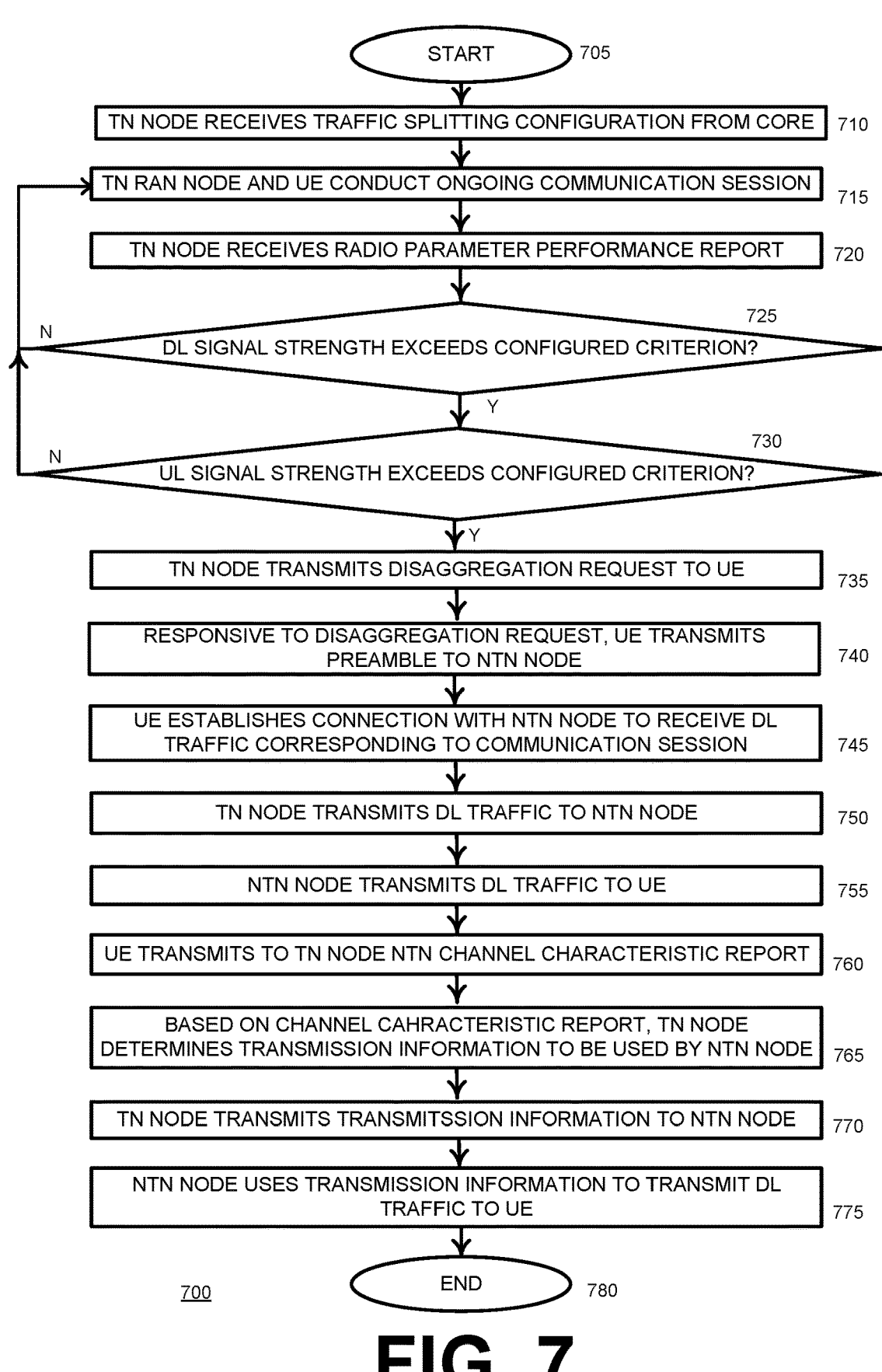

FIG. 7 illustrates a flow diagram of an example embodiment method.

FIG. 8 illustrates a block diagram of an example method embodiment.

FIG. 9 illustrates a block diagram of an example terrestrial radio network node.

FIG. 10 illustrates a block diagram of an example non-transitory machine-readable medium embodiment.

Figure 11:
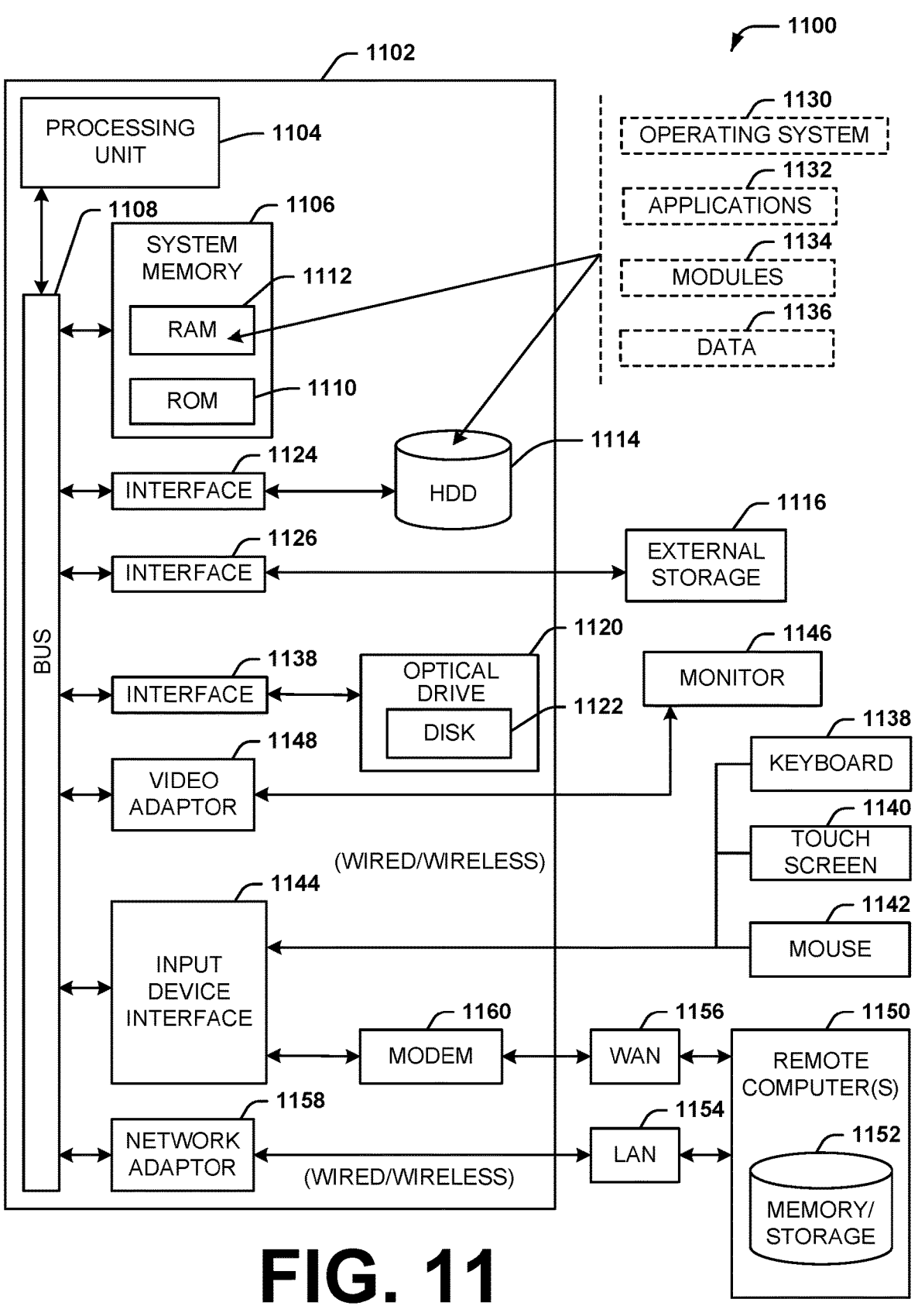

FIG. 11 illustrates an example computer environment.

Figure 12:
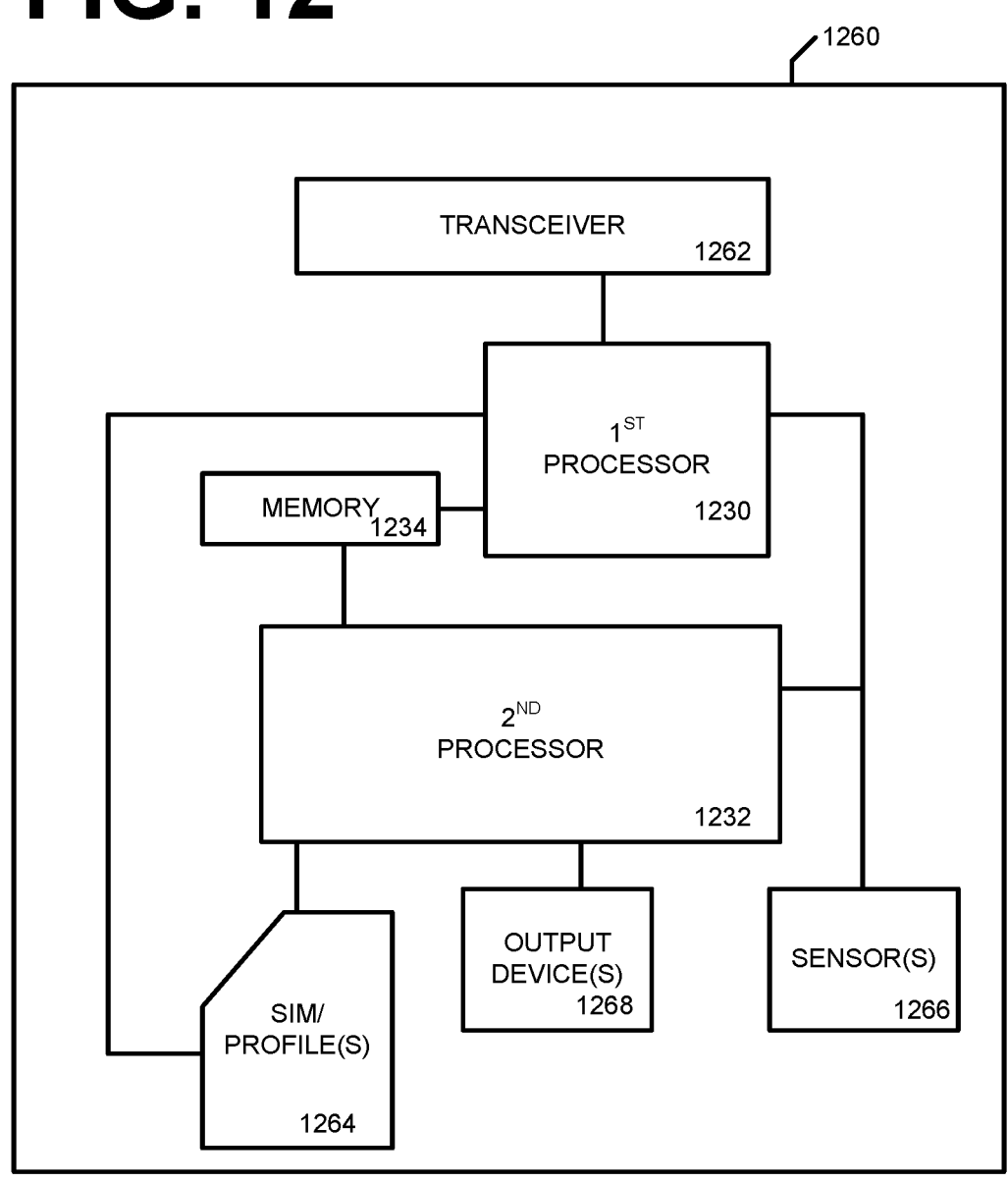

FIG. 12 illustrates a block diagram of an example wireless user equipment.

DETAILED DESCRIPTION OF THE DRAWINGS

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Figure 1:
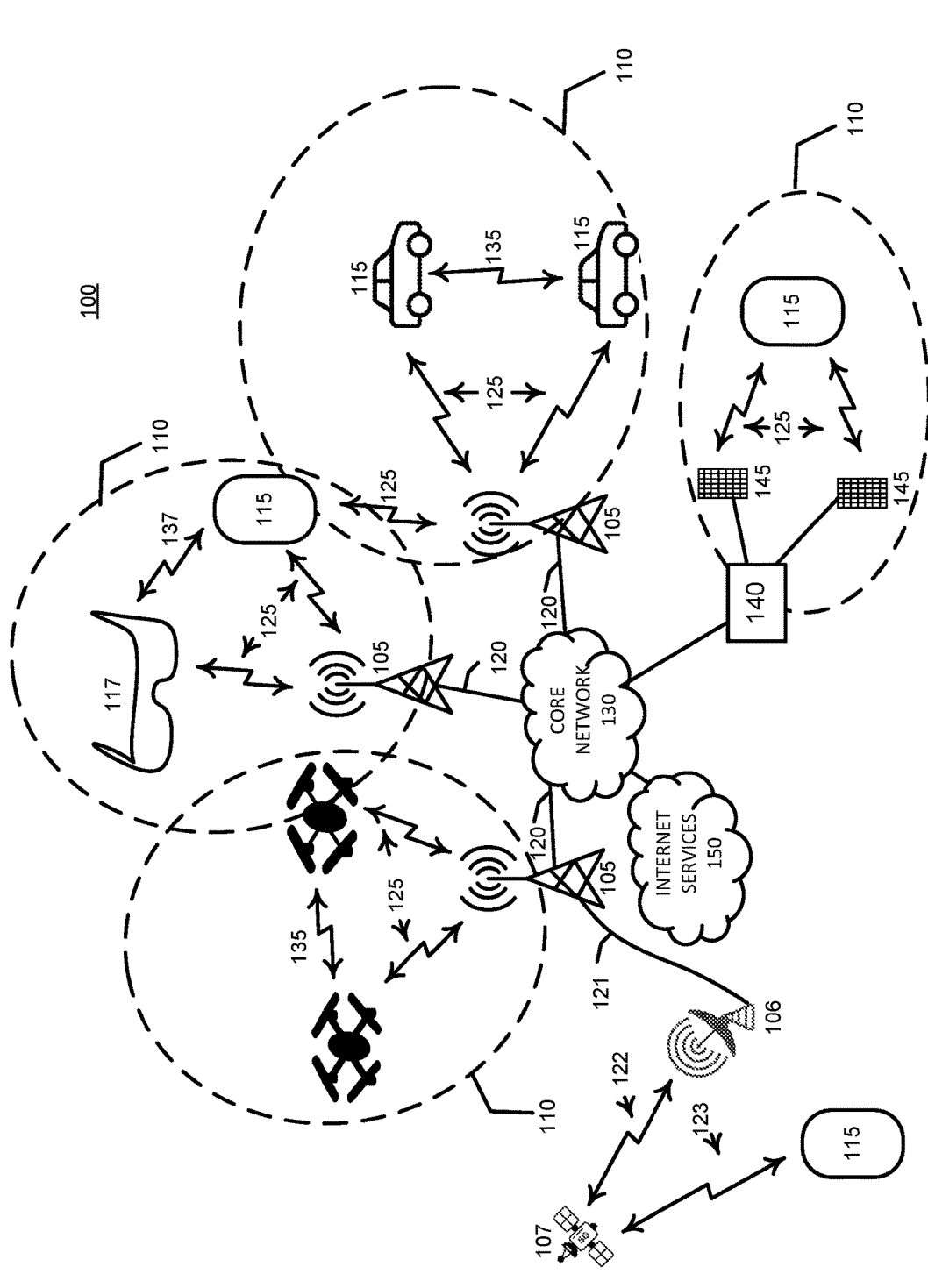
FIG. 1 illustrates wireless communication system environment.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 11.

Continuing with discussion of FIG. 1, base stations 105 may be dispersed throughout a geographic area to form the wireless communication system 100 and may be devices in different forms or having different capabilities. Base stations 105 and UEs 115 may wirelessly communicate via one or more communication links 125. A base station 105 may be referred to as a RAN node. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, a wireless transmit receive unit ("WTRU"), or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, an end extended reality appliance, an extended reality processing unit, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The evolution of communication networks has witnessed remarkable advancements over the past decades. A significant extension of 5G's potential may lie beyond the conventional terrestrial infrastructure, giving rise to what are known as Non-Terrestrial Networks ("NTN").

Non-Terrestrial Networks may encompass a diverse range of technologies and architectures that may comprise space-based, airborne, and maritime platforms to enhance global communication capabilities. Integration of 5G and non-terrestrial environments may facilitate connectivity being established, maintained, and optimized to remote and underserved regions.

Satellites equipped with 5G capabilities constitute an aspect of 5G NTN. Satellites, positioned in low Earth orbit ("LEO"), medium Earth orbit ("MEO"), or geostationary orbit ("GEO"), may form an intricate web of interconnected nodes. The satellites can provide widespread coverage, offering high-speed data connections, low latency communication, and global mobility. Satellites may facilitate broadband access in rural and remote areas, disaster-stricken regions, and on moving vehicles, ships, and aircraft, thus bridging the digital divide.

Satellite-based NTN can bridge connectivity gaps in remote and rural areas, provide disaster recovery communication, and offer enhanced coverage for maritime and aeronautical services. High-altitude platforms and drones equipped with cellular capabilities can serve as temporary network relays for events, emergencies, or areas with signal-strength coverage deficiencies, such applications may benefit not only traditional voice and data services but also for technologies, such as, for example, Internet of Things ("IoT"), wherein connectivity is typically a desirable, or a fundamental requirement.

A non-terrestrial base station 106, which may comprise a satellite antenna, may be coupled to core network 130. Non-terrestrial base station 106 may communicate with satellite 107, which may communicate with a user equipment 115. Non-terrestrial base station 106, which may be referred to as a non-terrestrial network gateway, and satellite 107 may facilitate delivering traffic corresponding to a radio access network, which may comprise RAN nodes 105, core network 130, backhaul links 120, and long-range wireless links 125, to user equipment that may be located beyond coverage of a RAN node 105. Links 121 between RAN nodes 105 and satellite base station/gateway 106 may comprise coaxial, fiber, or wireless links that may be similar to links 120. Links 122 to satellite node 107 and links 123 from satellite/node 107 to UE 115 may comprise line-of-sight microwave signal transmission. A UE 115 may be configured with at least one antenna, or at least one processor, to facilitate transmitting or receiving microwave signals to/from satellite node 107. Description of herein, or reference to herein, a radio node or a radio network node may be a description or a reference to either a terrestrial RAN node 105, a non-terrestrial gateway 106, a non-terrestrial satellite node 107, or a combination of one or more of a terrestrial RAN node, a non-terrestrial gateway, or a non-terrestrial satellite. A terrestrial network node may be referred to as a "TN" node. Reference to a satellite node, or a non-terrestrial network node ("NTN node"), may comprise a reference to satellite 107, base station gateway 106, or a combination of satellite 107 and base station/gateway 106.

It will be appreciated that although an NTN node may benefit the most from embodiments disclosed herein, techniques disclosed herein may be of benefit to a ground-based RAN node. Thus, use of "radio network node" may be interpreted as referring to a ground-based RAN node or to a satellite node, which may comprise a gateway 106 or a satellite 107.

NTNs can enhance the limited coverage of ground RANs, which makes NTNs cost efficient in remote rural areas, mountainous areas, and generally where ground cellular deployments are either not possible or not cost efficient.

Incorporating RAN node functionality on board a satellite to facilitate serving user equipment may give rise to performance-related problems, such as, for example, limited transmission power by user equipment in the uplink direction may reduce the ability for the user equipment to establish a high-quality direct uplink radio link towards the satellite node/non-terrestrial node due to distance between the user equipment and the node. Although user equipment equipped with non-terrestrial network transceivers (e.g., non-terrestrial network capable user equipment, or NTN-capable user equipment) can receive non-terrestrial downlink traffic from NTN nodes; lower transmit power corresponding to user equipment with respect to transmitting signals to a non-terrestrial network node may limit delivery of uplink control traffic or uplink data payload traffic from a user equipment to the NTN node and may result in asymmetric NTN link performance.

An NTN-capable user equipment device that experiences a transmission power restriction, for example due to a low battery level or due to being operated close to a human head (e.g., not being operated via a Bluetooth or wired headset), may experience difficulty in establishing and maintaining an NTN uplink link. A NTN-capable user equipment experiencing such degraded ability to communicate with an NTN node via what may be an already asymmetric communication session thus becomes even less able to facilitate acceptable communication performance with respect to the NTN node because communication of necessary uplink control feedback information transmitted from user equipment devices to the NTN node, which control information may be needed for managing and provisioning corresponding NTN downlink traffic flows, becomes more degraded due to the poor uplink link performance. Furthermore, existing conventional uplink coverage enhancement schemes used for ground-based long range wireless communication (e.g., uplink payload repetitions) cannot be directly adopted for NTN uplink links due to the large distance between a terrestrially located user equipment devices and an NTN node (e.g., a satellite). Using conventional techniques to effectively extend uplink coverage by approximately tens of meters may result in de minimis improvement at best with respect to uplink performance corresponding to a radio link between a terrestrially located user equipment and a non-terrestrial network node.

According to embodiments disclosed herein, a ground/terrestrial radio access network node ("TN RAN node") may dynamically trigger and activate NTN uplink traffic disaggregation, of traffic corresponding to an NTN-capable active device, based on real-time coverage/signal strength conditions determined with respect to TN and NTN interface(s)/link(s) at a TN RAN node and at an NTN node, respectively. Embodiments disclosed herein may comprise non-transparent NTN uplink traffic being relayed via a TN RAN node and corresponding TN interface links 125. (The term 'non-transparent' may refer to a TN RAN node triggering and controlling such relaying instead of passively relaying NTN uplink traffic based on a determination made by a user equipment or an NTN node.) A TN RAN node may process uplink control information, received from NTN-capable user equipment devices that may receive NTN downlink traffic via an NTN interface link. For example, a ground/TN RAN node may determine a transmission configuration corresponding to an active NTN/satellite in terms of an NTN modulation and coding scheme ("MCS") and transmit the determined MCS configuration to an NTN-capable user equipment device, or NTN-capable UE device group, with respect to which NTN uplink traffic and control information are relayed via the TN RAN node. Such determining of an NTN MCS may be facilitated by capability of a TN RAN node to determine real-time NTN radio conditions experienced by NTN-capable UE devices and associated with NTN uplink traffic relaying. Thus, embodiments disclosed herein may facilitate NTN-capable user equipment devices in managing power consumption and satisfying of symmetric NTN downlink-uplink link performance requirements.

According to conventional techniques, a RAN node determines transmission configurations (e.g., modulation and coding levels) usable with respect to user equipment connected to the node). Embodiments disclosed herein facilitate a RAN node determining and sharing/exchanging transmission configuration information corresponding to another RAN node (e.g., an NTN node) that may only facilitate delivery of downlink traffic to a user equipment or user equipment group. A determined transmission configuration may be associated with either a single NTN-capable user equipment device or user equipment corresponding to an NTN-capable user equipment device group. An NTN node may be able to use the same transmission configuration for a group of user equipment due to the semi-static nature of NTN node connectivity with respect to a geographic coverage area, within which a group of user equipment are located, being small compared to the distance between the geographic coverage area and the NTN node.

Embodiments disclosed herein may facilitate real-time, coverage-triggered/signal-strength-triggered, disaggregation of NTN downlink traffic from NTN uplink traffic being delivered by an NTN node and may facilitate delivery of the disaggregated downlink traffic via the NTN node and delivery of the disaggregated uplink traffic via a TN RAN node to which a reduced-power signal transmitted by a user equipment can better reach than a farther-away NTN node. The user equipment may transmit to a TN RAN node uplink radio signaling/reporting messages indicative of NTN downlink quality corresponding to downlink traffic delivery being facilitated by an NTN node.

Figure 2:
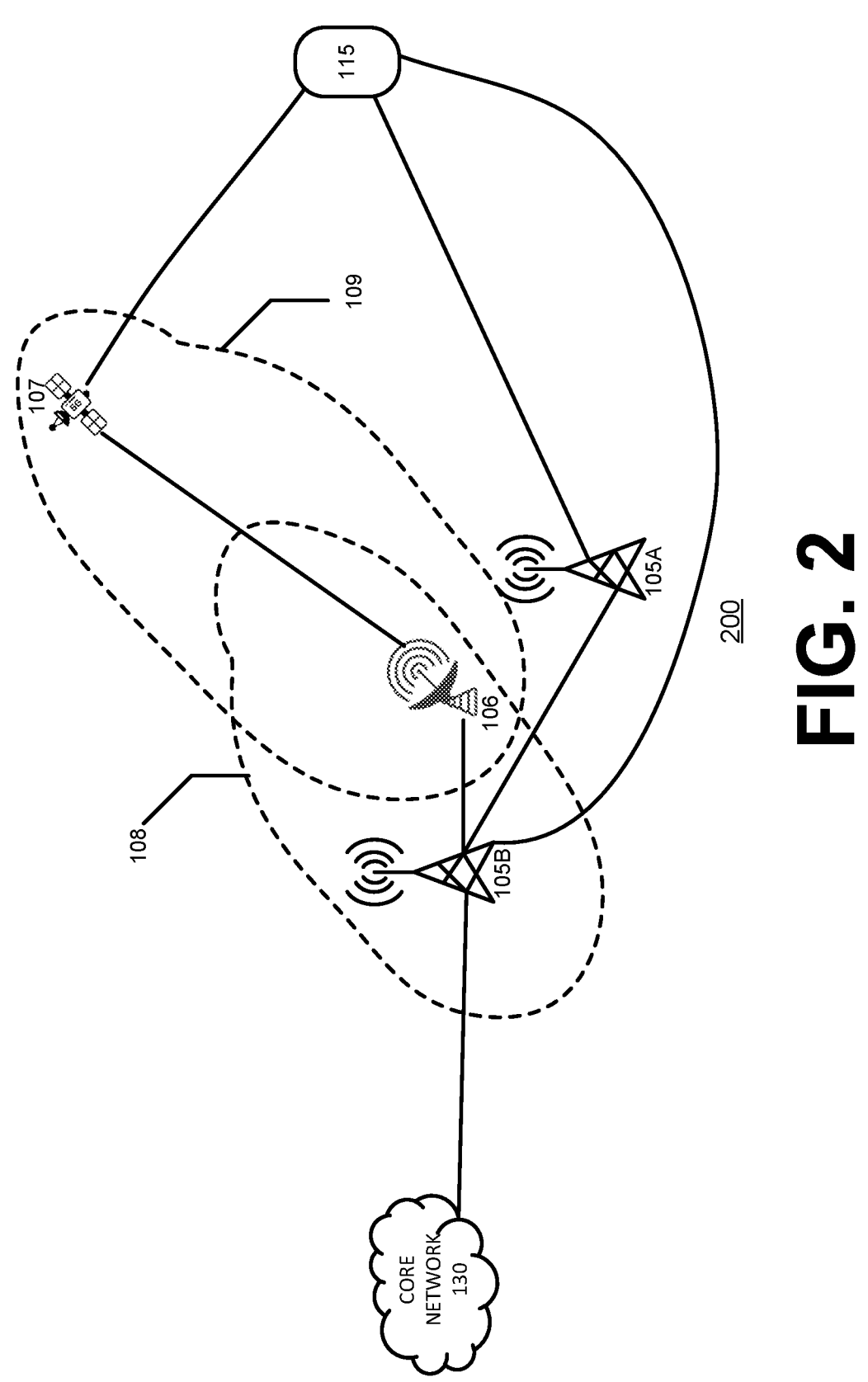
FIG. 2 illustrates an environment with a satellite base station and satellite that are capable of communication of traffic corresponding to a radio access network.

Turning now to FIG. 2, the figure illustrates ground-based RAN node 105A, base station 106, and NTN node 107, any one or more of which may be referred to as a radio network node. In reference to some embodiments disclosed herein, reference to a TN node may comprise a reference to node 108, which may comprise one or more of terrestrial RAN node 105A or gateway 106. In reference to some embodiments disclosed herein, reference to an NTN node may comprise a reference to node 109, which may comprise one or more of gateway 106 or satellite 107. In some embodiments, a communication session with UE 115 may be served by RAN node 105A. In some embodiments, a communication session with UE 115 may be served by RAN node 105B. UE 115 may communicate in an uplink direction via satellite 107 or either of RAN nodes 105A or 105B, either of which may relay uplink NTN traffic corresponding to UE 115.

Turning now to FIG. 3, terrestrial network radio access network node 105 may facilitate a communication session 305 with user equipment 115 established at act 1. Communication session 305 may comprise at least one downlink traffic flow 306 and at least one uplink traffic flow 307. Radio access network node 105 may receive at act 2 downlink-uplink traffic split configuration 301 (shown in more detail in FIG. 5) from core network 130 via backhaul interface links 120. Configuration 301 may comprise a minimum uplink received coverage threshold 515 usable by TN RAN node 105. Threshold 515 may be referred to as an uplink signal strength criterion. Configuration 301 may comprise a minimum downlink received coverage threshold 520 usable by NTN-capable device 115. Threshold 520 may be referred to as a non-terrestrial downlink signal strength criterion.

Configured threshold(s)/criterion/criteria 515 and 520, may be configured at TN RAN node 105 and NTN-capable user equipment devices 115, and may facilitate delivery of uplink traffic 307 via TN node 105 when the NTN capable device experiences a minimum acceptable coverage (e.g., criteria 515 and 520 are satisfied) with respect to the TN node and NTN node 107. Continuing description of FIG. 3, relaying of uplink NTN traffic 307 associated with NTN-capable user equipment 115 via TN node 105 may be avoided if uplink coverage corresponding to the NTN-capable user equipment is poor (e.g., the TN RAN determines that a signal received from the user equipment has a signal strength that does not satisfy the uplink signal strength criterion 515) to minimize negative impact on delivery of downlink traffic 306 by NTN node 107. Poor uplink coverage at TN RAN node 105 with respect to UE 115 would tend to negatively impact uplink transmission of control traffic corresponding to delivery of downlink traffic 306 via NTN node 107 even if the TN RAN node initiates relaying of uplink traffic 307. Based on satisfaction of criterion 520, as determined by TN RAN node as a result of receiving a radio parameter measurement report 310 indicating that UE 115 has determined that a received signal strength corresponding to a signal received by UE 115 from NTN node 107 satisfies criterion 520, the TN node may initiate receiving of uplink traffic 307 from UE 115 while corresponding downlink traffic is delivered to UE 115 via NTN-node 107. Therefore, analyzing uplink signal strength corresponding to UE 115 with respect to criterion 515 may facilitate avoiding disaggregation of traffic if disaggregation, which may improve delivery of downlink traffic 306 to UE 115, would likely result in excessive uplink control channel traffic corresponding to delivery by NTN node of downlink traffic 306. Accordingly, if uplink signal strength corresponding to UE 115 is weak (e.g., not greater than criterion 515 as determined by the TN RAN node) TN RAN node 105 may determine to avoid delivery of uplink traffic 307 to RAN node 105.

Receiving, at act 3, by TN RAN node 105 of radio parameter measurement report 310 may be part of a conventional inter-frequency coverage measurement report. On condition of determining, by TN RAN node 105, that a received signal downlink coverage/signal strength corresponding to NTN node 107 exceeds configured minimum NTN downlink coverage threshold 520 and that a received uplink coverage level/signal strength corresponding to UE 115 exceeds configured TN uplink coverage threshold 515, the TN RAN node may activate NTN-TN downlink-uplink traffic disaggregation with respect to uplink traffic 307 and downlink traffic 306.

Responsive to radio parameter measurement report 310, at act 4, TN RAN node 105 may transmit NTN downlink-uplink traffic disaggregation request 315, via TN downlink radio interface 125, toward NTN-capable device 115 indicative of one or more of the following information elements: an NTN identifier corresponding to NTN node 107, with respect to which handing of downlink traffic 306 will be disaggregated from uplink traffic 307, which may be delivered via TN node 105; or one or more downlink traffic flow identifiers or downlink bearer identifiers, indicative of traffic flows or bearers with respect to which traffic is to be disaggregated with respect to the indicated NTN node (e.g., node 107). The downlink traffic flow identifiers or downlink bearer identifiers may be applicable when critical downlink flows as well as all uplink flows are to be handled via TN RAN node 105. For example, capacity-hungry downlink traffic flows may be delivered by NTN node 107 that may provide more downlink bandwidth than RAN node 105. However, latency-critical downlink traffic flows and respective uplink control and data payload may be delivered via TN RAN node 105. At act 5, UE 115 may transmit to NTN node 107 a preamble 320 to establish a connection with the NTN node for purposes of receiving downlink traffic 306. At act 6, terrestrial RAN node 105 may route downlink traffic 306, indicated in disaggregation request 315, to non-terrestrial network node 107 for relaying thereby to user equipment 115 at act 7 via the connection established in response to the preamble transmitted at act 5.

In an embodiment, as shown in FIG. 4, TN RAN node 105 may, at act 8, route downlink traffic 306, indicated in disaggregation request 315 (described in reference to FIG. 3), to non-terrestrial network node 107 for relaying thereby to user equipment 115 at act 9. At act 10, TN RAN node 105 may receive an NTN channel quality indicator ("CQI") and precoding matrix indicator ("PMI") report 330, which may be referred to as non-terrestrial downlink channel characteristic report, from NTN-capable user equipment device 115, corresponding to the NTN identifier indicated in disaggregation request 315. Because facilitating of relaying downlink traffic by TN RAN node 105 may comprise processing uplink control information, received from NTN-capable user equipment device 115, that corresponds to downlink traffic 306 for which relaying via NTN node 107 was initiated by TN RAN node 105, information contained in report 330 may be usable by TN RAN node to determine transmission information to be usable by NTN node 107 to facilitate delivering downlink traffic to NTN-capable UE 115.

At act 11, TN RAN node 105 may determine an NTN transmission modulation and coding scheme (MCS) and/or MCS indication that satisfies information indicated in an NTN CQI and PMI report(s) 330. The MCS information may be usable by NTN RAN node 107 for downlink transmissions toward NTN-capable device 115 of downlink traffic 306. At act 12, TN RAN node 105 may transmit, towards NTN satellite 107, an NTN transmission MCS request 335, which may be referred to as a disaggregated traffic NTN channel quality adaptation configuration and which may be indicative of one or more user equipment identifiers 410, corresponding to active NTN-capable user equipment 115-1 . . . 115-$k$, associated with NTN MCSs/MCS indications 405-1 . . . 405-$i$ usable by NTN node/satellite 107 to deliver downlink traffic 306 to one or more of the user equipment.

Turning now to FIG. 6, the figure illustrates a timing diagram of an example embodiment method 600. At act 605, terrestrial network RAN node 105 may receive a downlink-uplink traffic split configuration, from core network equipment via backhaul interface link. The traffic split configuration received at act 605 may comprise a minimum terrestrial network received coverage threshold usable to analyze signal strength corresponding to one or more uplink signals received from a user equipment at the TN RAN node. The traffic split configuration received at act 605 may comprise a minimum non-terrestrial network received coverage threshold usable to analyze signal strength corresponding to one or more downlink signals received from NTN node 107 at NTN-capable user equipment 115. At act 610, TN RAN node 105 may receive an NTN received coverage report, which may be referred to as a radio parameter measurement report, from NTN-capable device 115.

Based on information contained in a radio parameter measurement report, on condition of determining a received downlink coverage, corresponding to NTN node 107, that is larger than the configured minimum NTN downlink coverage threshold, and on condition of determining a received uplink coverage level corresponding to UE 115 that is larger than the configured TN uplink coverage threshold, TN RAN node may activate at act 615 NTN-TN downlink-uplink traffic disaggregation with respect to UE 115. At act 620, TN RAN node may transmit a downlink-uplink traffic disaggregation request, via TN downlink radio interface link(s) 125 toward NTN-capable user equipment device 115, indicative of at least one of: a NTN-node identifier corresponding to node 107 to which downlink traffic handling will be disaggregated and offloaded, or one or more downlink traffic flow or bearer identifiers corresponding to downlink traffic that will be disaggregated and relayed via the indicated NTN node. At act 625, downlink traffic determined to be delivered via NTN node 1-7 may be routed/transmitted by TN RAN node 105 to NTN node 107 for delivery to UE 115.

In an embodiment, at act 630, TN RAN node 105 may receive NTN channel quality indicator and precoding matrix indicator report(s) from NTN-capable user equipment device 115. The reports received at act 630 may correspond to previously configured NTN identifiers identified as being enabled for delivery of disaggregated downlink traffic delivery. Based on information contained in the report(s) received at act 630, TN RAN node 105 may determine at act 635 NTN transmission information comprising modulation and coding scheme information, or one or more indications thereof, that if used by NTN node 107 would facilitate delivery of downlink traffic to UE 116 according to a quality of service corresponding to disaggregated downlink traffic routed from TN RAN node to NTN node 107 for transmission thereby to UE 115. At act 640, TN RAN node may transmit, towards NTN satellite 107, via gateway or backhaul links (including microwave links or other wireless link), an NTN transmission request including one or more NTN-capable user equipment identifiers, which may include an identifier corresponding to UE 115, and corresponding NTN MCS information determined by TN RAN node 105 at act 635, to be used by the NTN to deliver downlink traffic to UE 115.

Turning now to FIG. 7, the figure illustrates a flow diagram of an example embodiment 700. Method 700 begins at act 705. At act 710, the terrestrial node may receive a traffic splitting configuration from core network equipment. The traffic splitting configuration may comprise a minimum uplink received coverage threshold, which may be referred to as an uplink signal strength criterion, usable by the terrestrial radio access network node to facilitate determining whether to offload downlink traffic corresponding to at least one of the at least one downlink traffic flow to be delivered to the user equipment via a non-terrestrial network node. The traffic splitting configuration may comprise a minimum downlink received coverage threshold, which may be referred to as a non-terrestrial downlink signal strength criterion, usable by the terrestrial radio access network node to facilitate determining whether to offload downlink traffic corresponding to at least one of the at least on downlink traffic flows to be delivered to the user equipment via a non-terrestrial network node.

At act 715, a terrestrial radio access network node and a non-terrestrial-network-capable user equipment may conduct an ongoing communication session comprising at least one uplink traffic flow and at least one downlink traffic flow.

At act 720, the terrestrial radio access network node may receive from the user equipment a radio parameter performance report that may comprise an indication of a downlink signal strength corresponding to a non-terrestrial network node (e.g., a satellite with respect to which the user equipment is located within a downlink signal coverage zone/geographic area corresponding to the satellite). The downlink signal strength indicated in a radio parameter performance report received at act 720 may be determined by the user equipment. At act 725, based on the downlink signal strength corresponding to the non-terrestrial network node indicated in the radio parameter performance report received at act 720, the terrestrial radio access network node may determine whether the downlink signal strength indicated in the radio parameter performance report exceeds the configured downlink signal strength criterion received via the traffic splitting configuration at act 710. If a determination is made that the downlink signal strength corresponding to the non-terrestrial network node as determined by the user equipment does not exceed the configured downlink signal strength criterion, method 700 returns to act 715 and the terrestrial radio access network node and the user equipment continue to conduct the ongoing communication session.

However, if a determination is made at act 725 that the downlink signal strength indicated in the radio parameter performance report received at act 720 exceeds the configured downlink signal strength criterion, method 700 advances to act 730. At act 730, the terrestrial radio access network node may determine whether a signal strength corresponding to a signal received from the user equipment exceeds the uplink signal strength criterion contained in the traffic splitting configuration. If a determination is made at act 730 that an uplink signal strength corresponding to an uplink signal transmitted to the radio access network node by the user equipment does not exceed the configured criterion method 700 returns to act 715 and the terrestrial radio access network node and the user equipment continue conducting the ongoing communication session.

However, if a determination is made at act 730 that a single strength corresponding to an uplink signal received by the terrestrial radio access network node from the user equipment exceeds the configured uplink signal strength criterion, method 700 may advance to act 735. At act 735, the terrestrial radio access network node may transmit a traffic disaggregation request to the user equipment to be indicative to the user equipment that the terrestrial radio access network node has determined that at least one traffic flow corresponding to the communication session is to be split from, or disaggregated from, other traffic flows corresponding to the traffic communication session such that delivery to the user equipment of the at least one traffic flow that is split from the other traffic flows is to be facilitated by the non-terrestrial network node.

At act 740, responsive to receiving the disaggregation request transmitted at act 735, the user equipment may transmit to the non-terrestrial network node, which may be indicated in the disaggregation request, a preamble to initiate establishing a communication session with the non-terrestrial network node to facilitate receiving the at least one disaggregated downlink traffic flow. Based on the preamble transmitted at act 740, at act 745 the user equipment and the non-terrestrial network node may establish a connection to facilitate the user equipment receiving the at least one downlink traffic flow indicated by the terrestrial radio access network node in the disaggregation request to be split from other traffic flows corresponding to the ongoing communication session. At act 750, the terrestrial radio access network node may transmit the at least one disaggregated downlink traffic flow to the non-terrestrial network node and at act 755 the non-terrestrial network node, after receiving the at least one disaggregated downlink traffic flow from the terrestrial radio access network node, may transmit the at least one disaggregated downlink traffic flow to the user equipment via the connection established at act 745.

At act 760, the non-terrestrial network capable user equipment may transmit to the terrestrial radio access network node a non-terrestrial network channel characteristic report, which may comprise an NTN channel quality indicator or a precoding matrix indicator, corresponding to the connection established at act 745. At act 765, based on information contained in the not terrestrial network channel characteristic report, the terrestrial radio access network node may determine transmission information to be used by the non-terrestrial network node to facilitate delivery of the at least one disaggregated downlink traffic flow to the user equipment. The transmission information may comprise modulation and coding scheme information. At act 770, the terrestrial radio access network node may transmit the transmission information determined at act 765 to the non-terrestrial network node. At act 775, the non-terrestrial network node may use transmission information transmitted by the terrestrial radio access network node at act 770 to facilitate transmitting of the at least one disaggregated downlink traffic flow to the user equipment. Method 700 advances to act 780 and ends.

Analysis at act 730 of an uplink signal strength corresponding to an uplink signal transmitted by the user equipment to the terrestrial node or analysis of a downlink signal strength corresponding to a downlink signal transmitted by the non-terrestrial node to the user equipment may facilitate the terrestrial network node determining, based on the uplink or downlink signal strengths satisfying configured respective criterion, that if downlink traffic is disaggregated from uplink traffic for delivery to the user equipment via the non-terrestrial network node that the terrestrial network node will not be overwhelmed with control channel information transmitted by the user equipment to the terrestrial network node. For example, if a downlink signal received by the user equipment from the non-terrestrial node does not exceed the configured downlink signal strength criterion, the user equipment may transmit to the terrestrial radio access network node multiple negative acknowledgement indications indicative of one or more downlink traffic packets, transmitted by the non-terrestrial node to the user equipment, that were unsuccessfully received or unsuccessfully decoded by the user equipment. Similarly, even if a downlink signal strength corresponding to the non-terrestrial network node is determined to be high enough at the user equipment such that an excessive amount of control channel traffic corresponding to downlink traffic that may be relayed by the non-terrestrial network node to the user equipment is deemed by the terrestrial network node as not excessive, if an uplink signal strength corresponding to the user equipment at the terrestrial radio access network node, as determined by the terrestrial radio access node, does not satisfy a configured uplink signal strength criterion, the terrestrial node may determine not to disaggregate traffic and either offload downlink traffic as well as uplink traffic delivery, corresponding to the NTN-capable user equipment, to be facilitated by the non-terrestrial network node, or the terrestrial node may determine not to offload any traffic, even downlink traffic, to be delivered to the user equipment by the non-terrestrial network node.

Generally, downlink and uplink traffic may be correlated insofar as uplink traffic may be used to deliver HARQ decoding state feedback status indications (e.g., acknowledgement ("ACK") or negative acknowledgement ("NACK")) corresponding to received downlink traffic. An unstable uplink link (e.g., channel conditions may be good sometimes and poor sometimes) carrying HARQ feedback, which may be an example of control information corresponding to downlink traffic, may result in delivery of the HARQ feedback being negatively impacted/delayed, which may impact overall downlink traffic delivery performance, even if downlink signal strength between an NTN node and NTN-capable UE is good. For example, an ACK/NACK feedback indication may not timely reach a transmitter that transmitted downlink traffic corresponding to the ACK/NACK (e.g., an ACK/NACK transmitted by an NTN-capable UE may be delayed in reaching an NTN node because uplink channel performance between the UE and a TN RAN node is poor). As a result, downlink transmission to the UE by the NTN node of further traffic packets may be halted to give the UE additional time to send HARQ feedback. Furthermore, a downlink connection between the NTN node and the UE may be terminated, or the NTN node may assume that all previously transmitted packets for which HARQ feedback has not yet been received by the NTN node (e.g., due to the poor uplink channel conditions between the UE and TN node) were not successfully decoded by the UE, and thus the NTN node may retransmit the already-transmitted packet, which may have ben successfully received by the UE but with respect to which the NTN node has not received HARQ feedback because of poor channel conditions between the UE and TN node. Accordingly, analyzing, by a TN RAN node at act 720, uplink signal strength with respect to a configured uplink signal strength criterion may facilitate avoiding, by the TN RAN node, offloading traffic to be delivered by an NTN node to a UE, even if the UE determines a strong downlink signal with respect to the NTN node, if poor uplink channel conditions (or uplink transmit power by the UE) cannot facilitate reliably carrying uplink control channel information from the UE to the TN RAN node. In an embodiment, an operator of an NTN node or an operator of an NTN core network component may select one or more of the non-terrestrial downlink signal strength criterion or the uplink signal strength criterion in the traffic split/splitting configuration received at act 710 such that the TN node does not attempt to offload downlink traffic for delivery to the UE by the NTN node, while still delivering uplink traffic via the TN node, unless the TN node can facilitate uplink traffic delivery received from the UE such that such downlink traffic via the NTN node is not negatively impacted, at least with respect to a minimum service level, based on the criterion/criteria configured via the traffic split/splitting configuration.

Turning now to FIG. 8, the figure illustrates an example embodiment method 800 comprising at block 805 facilitating, by a terrestrial radio network node comprising at least one processor receiving, from a user equipment, a radio parameter measurement report comprising a non-terrestrial downlink signal strength indication indicative of a non-terrestrial downlink signal strength corresponding to a downlink signal received from a non-terrestrial network node; at block 810 analyzing the non-terrestrial downlink signal strength with respect to a non-terrestrial downlink signal strength criterion to result in an analyzed non-terrestrial downlink signal strength; at block 815 determining, by the terrestrial radio network node, that the analyzed non-terrestrial downlink signal strength satisfies the non-terrestrial downlink signal strength criterion to result in a determined non-terrestrial downlink signal strength; and at block 820 based on the non-terrestrial downlink signal strength criterion being satisfied by the analyzed non-terrestrial downlink signal strength, facilitating, by the terrestrial radio network node, transmitting, to the user equipment, a traffic disaggregation request indicative that delivery, to the user equipment, of downlink traffic, associated with at least one downlink traffic flow corresponding to at least one communication session being facilitated by the terrestrial radio network node, is to be facilitated by the non-terrestrial network node.

Turning now to FIG. 9, the figure illustrates an example terrestrial radio network node 900, comprising at block 905 at least one processor configured to process executable instructions that, when executed by the at least one processor, facilitate performance of operations, comprising receiving, from a user equipment, a non-terrestrial coverage report comprising a non-terrestrial downlink signal strength indication indicative of a non-terrestrial downlink signal strength corresponding to a downlink signal received from a non-terrestrial network node; at block 910 analyzing the non-terrestrial downlink signal strength with respect to a non-terrestrial downlink signal strength criterion to result in an analyzed non-terrestrial downlink signal strength; at block 915 determining, by the terrestrial radio network node, that the analyzed non-terrestrial downlink signal strength satisfies the non-terrestrial downlink signal strength criterion to result in a determined analyzed non-terrestrial downlink signal strength; at block 920 based on the non-terrestrial downlink signal strength criterion being satisfied by the determined analyzed non-terrestrial downlink signal strength, transmitting, to the user equipment, a downlink-uplink traffic disaggregation request indicative that delivery, to the user equipment, of at least one downlink traffic flow, being facilitated by the terrestrial radio network node, is to be facilitated by the non-terrestrial network node; at block 925 responsive to transmitting the downlink-uplink traffic disaggregation request, receiving, from the user equipment, at least one downlink channel characteristic report comprising non-terrestrial transmission information corresponding to the non-terrestrial network node; at block 930 based on the non-terrestrial transmission information, determining at least one modulation and coding scheme that is capable of facilitating delivery of the at least one downlink traffic flow according to the non-terrestrial transmission information; and at block 935 transmitting, to the non-terrestrial network node, a non-terrestrial network node transmission request indicative to the non-terrestrial network node to facilitate the delivery of the at least one downlink traffic flow to the user equipment according to the at least one modulation and coding scheme.

Turning now to FIG. 10, the figure illustrates a non-transitory machine-readable medium 1000 comprising at block 1005 executable instructions that, when executed by a processor of a terrestrial radio network node, facilitate performance of operations, comprising receiving, from a user equipment, a non-terrestrial coverage report comprising a non-terrestrial downlink signal strength indication indicative of a non-terrestrial downlink signal strength corresponding to a downlink signal received from a non-terrestrial network node; at block 1010 analyzing the non-terrestrial downlink signal strength with respect to a non-terrestrial downlink signal strength criterion to result in an analyzed non-terrestrial downlink signal strength; at block 1015 determining that the analyzed non-terrestrial downlink signal strength satisfies the non-terrestrial downlink signal strength criterion to result in a determined analyzed non-terrestrial downlink signal strength; at block 1020 determining a user equipment uplink signal strength corresponding to the user equipment; at block 1025 analyzing the user equipment uplink signal strength with respect to an uplink signal strength criterion to result in an analyzed user equipment uplink signal strength; at block 1030 determining that the analyzed user equipment uplink signal strength satisfies the uplink signal strength criterion to result in a determined analyzed user equipment uplink signal strength; at block 1035 based on the non-terrestrial downlink signal strength criterion being satisfied by the determined analyzed non-terrestrial downlink signal strength and the uplink signal strength criterion being satisfied by the analyzed user equipment uplink signal strength, transmitting, to the user equipment, a downlink-uplink traffic disaggregation request indicative that delivery of at least one downlink traffic flow to the user equipment being facilitated by the terrestrial radio network node is to be facilitated by the non-terrestrial network node; at block 1040 responsive to the transmitting of the downlink-uplink traffic disaggregation request, receiving, from the user equipment, at least one non-terrestrial downlink channel characteristic report, comprising non-terrestrial transmission information associated with a downlink signal received by the user equipment from the non-terrestrial network node; at block 1045 based on the at least one non-terrestrial downlink channel characteristic report, determining non-terrestrial transmission configuration information comprising modulation information and coding information capable of facilitating the delivery of the at least one downlink traffic flow according to the non-terrestrial transmission information; and at block 1050 transmitting, to the non-terrestrial network node, a non-terrestrial network node transmission request indicative to the non-terrestrial network node to facilitate the delivery of the at least one downlink traffic flow to the user equipment according to the non-terrestrial transmission configuration information.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from disk 1122, for example a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, an intermediate XR processing unit, and the like. UE 1260 may comprise a first processor 1230, a second processor 1232, and a shared memory 1234. UE 1260 may include radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links 125, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105, node 107, or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both first processor portion 1230 and second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor second 1232, which may be a more sophisticated application processor than the first processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need the second processor for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, light sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |

TABLE 1-continued

| Term | Definition |
| --- | --- |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a terrestrial radio network node comprising at least one processor, receiving, from a user equipment, a radio parameter measurement report comprising a non-terrestrial downlink signal strength indication indicative of a non-terrestrial downlink signal strength corresponding to a downlink signal received from a non-terrestrial network node;

analyzing the non-terrestrial downlink signal strength with respect to a non-terrestrial downlink signal strength criterion to result in an analyzed non-terrestrial downlink signal strength;

determining, by the terrestrial radio network node, that the analyzed non-terrestrial downlink signal strength satisfies the non-terrestrial downlink signal strength criterion to result in a determined non-terrestrial downlink signal strength; and based on the non-terrestrial downlink signal strength criterion being satisfied by the analyzed non-terrestrial downlink signal strength, facilitating, by the terrestrial radio network node, transmitting, to the user equipment, a traffic disaggregation request indicative that delivery, to the user equipment, of downlink traffic, associated with at least one downlink traffic flow corresponding to at least one communication session being facilitated by the terrestrial radio network node, is to be facilitated by the non-terrestrial network node, wherein the traffic disaggregation request comprises at least one of: a non-terrestrial network node identifier corresponding to the non-terrestrial network node, at least one downlink traffic flow identifier associated with the at least one downlink traffic flow, or at least one downlink bearer identifier corresponding to at least one downlink bearer, according to which at least one downlink traffic flow from the terrestrial radio network node to the user equipment is being delivered.

2. The method of claim 1, further comprising:

determining, by the terrestrial radio network node, that at least one downlink traffic flow associated with at least one of the at least one downlink bearer identifier corresponds to a latency requirement that is more stringent than a non-terrestrial downlink latency corresponding to the non-terrestrial network node to result in a determined downlink bearer identifier; and facilitating, by the terrestrial radio network node, delivery of at least one downlink traffic flow associated with the determined downlink bearer identifier.

3. The method of claim 2, wherein the at least one downlink traffic flow corresponding to the at least one communication session being facilitated by the terrestrial radio network node that is to be facilitated by the non-terrestrial network node comprises a first downlink traffic flow, wherein the at least one downlink traffic flow associated with the determined downlink bearer identifier is a second downlink traffic flow corresponding to the at least one communication session, and wherein the method further comprises:

determining, by the terrestrial radio network node, that the first downlink traffic flow corresponds to a latency requirement that is less stringent than the non-terrestrial downlink latency.

4. The method of claim 1, further comprising:

facilitating, by the terrestrial radio network node, receiving, from the user equipment, at least one non-terrestrial downlink channel characteristic report comprising non-terrestrial transmission information corresponding to the non-terrestrial network node;

based on the non-terrestrial transmission information indicated in the at least one non-terrestrial downlink channel characteristic report, determining, by the terrestrial radio network node, non-terrestrial modulation and coding capable of facilitating delivery, by the non-terrestrial network node, of the downlink traffic associated with at least one downlink traffic flow; and facilitating, by the terrestrial radio network node, transmitting, to the non-terrestrial network node, a non-terrestrial network node transmission request indicative to the non-terrestrial network node to facilitate the delivery of the downlink traffic associated with the at least one downlink traffic flow to the user equipment according to the non-terrestrial modulation and coding.

5. The method of claim 4, wherein the non-terrestrial transmission information indicated by the at least one non-terrestrial downlink channel characteristic report comprises at least one of: a non-terrestrial channel quality indication, a precoding matrix indication, or a rank indication.

6. The method of claim 4, wherein the non-terrestrial network node transmission request comprises an identifier corresponding to the user equipment.

7. The method of claim 4, wherein the user equipment is a first user equipment, wherein the at least one downlink traffic flow is a first downlink traffic flow, wherein the at least one communication session is a first communication session, wherein the non-terrestrial modulation and coding scheme is a first non-terrestrial modulation and coding scheme, and wherein the method further comprises:

based on the non-terrestrial transmission information indicated in the at least one non-terrestrial downlink channel characteristic report, determining, by the terrestrial radio network node, a second non-terrestrial modulation and coding scheme that is capable of facilitating delivery, by the non-terrestrial network node to a second user equipment, of downlink traffic associated with a second downlink traffic flow associated with a second communication session, wherein the non-terrestrial network node transmission request is further indicative to the non-terrestrial network node to facilitate delivery, to the second user equipment, of the downlink traffic associated with the second downlink traffic flow according to the second non-terrestrial modulation and coding scheme.

8. The method of claim 1, further comprising:

determining, by the terrestrial radio network node, a user equipment uplink signal strength corresponding to the user equipment;

analyzing the user equipment uplink signal strength with respect to an uplink signal strength criterion to result in an analyzed user equipment uplink signal strength; and determining, by the terrestrial radio network node, that the analyzed user equipment uplink signal strength satisfies the uplink signal strength criterion to result in a determined user equipment uplink signal strength, wherein the facilitating of the transmitting of the traffic disaggregation request is further based on the uplink signal strength criterion being satisfied by the analyzed user equipment uplink signal strength.

9. The method of claim 8, wherein at least one of the non-terrestrial downlink signal strength criterion or the uplink signal strength criterion is received by the terrestrial radio network node from core network computing equipment.

10. A terrestrial radio network node, comprising:

at least one processor configured to process executable instructions that, when executed by the at least one processor, facilitate performance of operations, comprising:

receiving, from a user equipment, a non-terrestrial coverage report comprising a non-terrestrial downlink signal strength indication indicative of a non-terrestrial downlink signal strength corresponding to a downlink signal received from a non-terrestrial network node;

analyzing the non-terrestrial downlink signal strength with respect to a non-terrestrial downlink signal strength criterion to result in an analyzed non-terrestrial downlink signal strength;

determining, by the terrestrial radio network node, that the analyzed non-terrestrial downlink signal strength satisfies the non-terrestrial downlink signal strength criterion to result in a determined analyzed non-terrestrial downlink signal strength;

based on the non-terrestrial downlink signal strength criterion being satisfied by the determined analyzed non-terrestrial downlink signal strength, transmitting, to the user equipment, a downlink-uplink traffic disaggregation request indicative that delivery, to the user equipment, of at least one downlink traffic flow, being facilitated by the terrestrial radio network node, is to be facilitated by the non-terrestrial network node; responsive to transmitting the downlink-uplink traffic disaggregation request, receiving, from the user equipment, at least one downlink channel characteristic report comprising non-terrestrial transmission information corresponding to the non-terrestrial network node;

based on the non-terrestrial transmission information, determining at least one modulation and coding scheme that is capable of facilitating delivery of the at least one downlink traffic flow according to the non-terrestrial transmission information; and transmitting, to the non-terrestrial network node, a non-terrestrial network node transmission request indicative to the non-terrestrial network node to facilitate the delivery of the at least one downlink traffic flow to the user equipment according to the at least one modulation and coding scheme.

11. The terrestrial radio network node of claim 10, wherein the operations further comprise:

determining a user equipment uplink signal strength corresponding to the user equipment;

analyzing the user equipment uplink signal strength with respect to an uplink signal strength criterion to result in an analyzed user equipment uplink signal strength; and determining, by the terrestrial radio network node, that the analyzed user equipment uplink signal strength satisfies the uplink signal strength criterion to result in a determined user equipment uplink signal strength, wherein the facilitating of the transmitting of the down-link-uplink traffic disaggregation request is further based on the uplink signal strength criterion being satisfied by the analyzed user equipment uplink signal strength.

12. The terrestrial radio network node of claim 10, wherein the at least one downlink traffic flow comprises a first downlink traffic flow and a second downlink traffic flow, and wherein the non-terrestrial network node transmission request is indicative to the non-terrestrial network node to facilitate delivery of the first downlink traffic flow and the second downlink traffic flow according to the at least one modulation and coding scheme.

13. The terrestrial radio network node of claim 10, wherein the at least one downlink traffic flow comprises a first downlink traffic flow associated with a first latency requirement and a second downlink traffic flow associated with a second latency requirement, wherein the at least one modulation and coding scheme comprises a first modulation and coding scheme and a second modulation and coding scheme, and wherein the non-terrestrial network node transmission request is indicative to the non-terrestrial network node to facilitate delivery of the first downlink traffic flow according to the first modulation and coding scheme and to facilitate delivery of the second downlink traffic flow according to the second modulation and coding scheme.

14. The terrestrial radio network node of claim 10, wherein the at least one downlink traffic flow being facilitated by the terrestrial radio network node comprises a first downlink traffic flow associated with a first latency requirement and a second downlink traffic flow associated with a second latency requirement, and wherein the operations further comprise:

determining that the first latency requirement is capable of being satisfied by transmission of the first downlink traffic flow by the non-terrestrial network node, wherein the non-terrestrial network node transmission request is indicative to the non-terrestrial network node to facilitate delivery of the first downlink traffic flow to the user equipment according to the at least one modulation and coding scheme;

determining that transmission of the second downlink traffic flow by the non-terrestrial network node corresponds to nonsatisfaction of the second latency requirement; and avoiding indicating in the non-terrestrial network node transmission request that the non-terrestrial network node is to facilitate delivery of the second downlink traffic flow to the user equipment.

15. A non-transitory machine-readable medium, comprising executable instructions that, when executed by at least one processor of a terrestrial radio network node, facilitate performance of operations, comprising:

receiving, from a user equipment, a non-terrestrial coverage report comprising a non-terrestrial downlink signal strength indication indicative of a non-terrestrial downlink signal strength corresponding to a downlink signal received from a non-terrestrial network node;

analyzing the non-terrestrial downlink signal strength with respect to a non-terrestrial downlink signal strength criterion to result in an analyzed non-terrestrial downlink signal strength;

determining that the analyzed non-terrestrial downlink signal strength satisfies the non-terrestrial downlink signal strength criterion to result in a determined analyzed non-terrestrial downlink signal strength;

determining a user equipment uplink signal strength corresponding to the user equipment;

analyzing the user equipment uplink signal strength with respect to an uplink signal strength criterion to result in an analyzed user equipment uplink signal strength;

determining that the analyzed user equipment uplink signal strength satisfies the uplink signal strength criterion to result in a determined analyzed user equipment uplink signal strength;

based on the non-terrestrial downlink signal strength criterion being satisfied by the determined analyzed non-terrestrial downlink signal strength and the uplink signal strength criterion being satisfied by the analyzed user equipment uplink signal strength, transmitting, to the user equipment, a downlink-uplink traffic disaggregation request indicative that delivery of at least one downlink traffic flow to the user equipment being facilitated by the terrestrial radio network node is to be facilitated by the non-terrestrial network node;

responsive to the transmitting of the downlink-uplink traffic disaggregation request, receiving, from the user equipment, at least one non-terrestrial downlink channel characteristic report, comprising non-terrestrial transmission information associated with a downlink signal received by the user equipment from the non-terrestrial network node;

based on the at least one non-terrestrial downlink channel characteristic report, determining non-terrestrial transmission configuration information comprising modulation information and coding information capable of facilitating the delivery of the at least one downlink traffic flow according to the non-terrestrial transmission information; and transmitting, to the non-terrestrial network node, a non-terrestrial network node transmission request indicative to the non-terrestrial network node to facilitate the delivery of the at least one downlink traffic flow to the user equipment according to the non-terrestrial transmission configuration information.

16. The non-transitory machine-readable medium of claim 15, wherein the non-terrestrial network node transmission request comprises at least one of: a non-terrestrial network node identifier corresponding to the non-terrestrial network node; at least one downlink traffic flow identifier associated with the at least one downlink traffic flow; or at least one downlink bearer identifier corresponding to at least one downlink bearer, according to which at least one downlink traffic flow from the terrestrial radio network node to the user equipment is being delivered.

17. The non-transitory machine-readable medium of claim 15, wherein the non-terrestrial transmission information indicated by the at least one non-terrestrial downlink channel characteristic report comprises at least one of: a non-terrestrial channel quality indication, a precoding matrix indication, or a rank indication.

18. The non-transitory machine-readable medium of claim 15, wherein the operations further comprise:

during facilitation, by the non-terrestrial network node, of the delivery of the at least one downlink traffic flow to the user equipment, receiving, from the user equipment, downlink control information corresponding to the at least one downlink traffic flow, and directing the downlink control information to the non-terrestrial network node.

19. The non-transitory machine-readable medium of claim 15, wherein the directing of the downlink control information to the non-terrestrial network node comprises transmitting the downlink control information to a non-terrestrial gateway via a backhaul communication link.

20. The non-transitory machine-readable medium of claim 15, wherein the operations further comprise:

receiving, from the user equipment, at least one non-terrestrial downlink channel characteristic report comprising non-terrestrial transmission information corresponding to the non-terrestrial network node;

based on the non-terrestrial transmission information indicated in the at least one non-terrestrial downlink channel characteristic report, determining, by the terrestrial radio network node, non-terrestrial modulation and coding capable of facilitating delivery, via the non-terrestrial network node, of the downlink traffic associated with at least one downlink traffic flow; and transmitting, to the non-terrestrial network node, a non-terrestrial network node transmission request indicative to the non-terrestrial network node to facilitate the delivery of the downlink signal associated with the at least one downlink traffic flow to the user equipment according to the non-terrestrial modulation and coding.

* * * * *